United States Patent
Vij et al.

(10) Patent No.: US 12,073,348 B2
(45) Date of Patent: Aug. 27, 2024

(54) SYSTEMS AND METHODS OF DYNAMICALLY PRESENTING DATASETS IN A GRAPHICAL USER INTERFACE

(71) Applicant: ROYAL BANK OF CANADA, Toronto (CA)

(72) Inventors: Kanika Vij, Toronto (CA); Vincent Chiu-Hua Huang, Toronto (CA); Preet Kanwal Singh, Torono (CA)

(73) Assignee: ROYAL BANK OF CANADA, Toronto (CA)

( * ) Notice: Subject to any disclaimer, the term of this patent is extended or adjusted under 35 U.S.C. 154(b) by 0 days.

(21) Appl. No.: 17/013,499

(22) Filed: Sep. 4, 2020

(65) Prior Publication Data

US 2021/0073693 A1    Mar. 11, 2021

Related U.S. Application Data

(60) Provisional application No. 62/896,239, filed on Sep. 5, 2019, provisional application No. 63/056,388, filed on Jul. 24, 2020.

(51) Int. Cl.
| | |
|---|---|
| *G06F 16/2458* | (2019.01) |
| *G06F 16/22* | (2019.01) |
| *G06F 16/26* | (2019.01) |
| *G06F 17/18* | (2006.01) |

(Continued)

(52) U.S. Cl.
CPC ..... *G06Q 10/0635* (2013.01); *G06F 16/2246* (2019.01); *G06F 16/2474* (2019.01); *G06F 16/26* (2019.01); *G06F 17/18* (2013.01); *G06F 40/205* (2020.01)

(58) Field of Classification Search
None
See application file for complete search history.

(56) References Cited

U.S. PATENT DOCUMENTS

| | | | |
|---|---|---|---|
| 2006/0089837 A1* | 4/2006 | Adar | G06Q 20/04 |
| | | | 705/305 |
| 2010/0114634 A1* | 5/2010 | Christiansen | G06Q 30/018 |
| | | | 705/317 |

(Continued)

*Primary Examiner* — Dawaune A Conyers
(74) *Attorney, Agent, or Firm* — Norton Rose Fulbright Canada LLP

(57) ABSTRACT

Systems for dynamically updating a priority queue for scheduling data operations associated with data records. A method includes: detecting event data meeting a threshold value for identifying a shift in data operation relevance and traversing a cascading data structure to identify an auditable entity corresponding to one or more data records associated with the event data, the one or more data records corresponding to at least one branch of the cascading data structure. The method includes generating an updated priority queue for scheduling data operations based on priority weights associated with branches of the cascading data structure, the updated priority queue based on event data corresponding to the identified auditable entity relative to event data associated with one or more records corresponding to other auditable entities and transmitting a signal for dynamically communicating the updated priority queue for scheduling data operations associated with data records of respective auditable entities.

16 Claims, 16 Drawing Sheets

(51) Int. Cl.
*G06F 40/205* (2020.01)
*G06Q 10/0635* (2023.01)

(56) References Cited

U.S. PATENT DOCUMENTS

| | | | | |
|---|---|---|---|---|
| 2012/0259752 | A1* | 10/2012 | Agee | G06Q 40/00 |
| | | | | 705/35 |
| 2012/0296806 | A1* | 11/2012 | Abrahams | G06Q 40/025 |
| | | | | 705/38 |
| 2015/0026027 | A1* | 1/2015 | Priess | G06Q 20/4016 |
| | | | | 705/35 |
| 2018/0121484 | A1* | 5/2018 | Gerashchenko | |
| | | | | G06Q 10/06314 |
| 2021/0272040 | A1* | 9/2021 | Johnson | G06N 5/022 |
| 2021/0342337 | A1* | 11/2021 | Lu | G06F 11/3476 |

* cited by examiner

| Metrics | Principle Risk | Sub-risk | Category | Source |
|---|---|---|---|---|
| Market limit breaches | Market Risk | Market | Market Limits Excesses | LAMP |
| Late PnL submissions | Operational Risk | Finance | DFR | |
| PnL Signoffs | Operational Risk | Finance | DFR | |
| # of incident management tickets – Sev 1/2 | Operational Risk | Information Technology | Incident Management | ServiceNow |
| TSS non compliance rate | Operational Risk | Information Technology | TSS non compliance | |
| # of findings per transitAE | Operational Risk | Information Technology | IT Findings | Archer |
| # of aged recurring findings | Operational Risk | Information Technology | IT Findings | Archer |
| # of unvalidated and in use | Operational Risk | Models | Models | Maverick |
| # of high risk - unvalidated and in use | Operational Risk | Models | Models | Maverick |
| # of High Risk Models | Operational Risk | Models | Models | Maverick |
| # of Models in total | Operational Risk | Models | Models | Maverick |
| # of events | Operational Risk | Operational | OREs | Archer |
| # of fraud events | Operational Risk | Operational | OREs | Archer |
| # of timing errors | Operational Risk | Operational | OREs | Archer |
| $ impact of all events | Operational Risk | Operational | OREs | Archer |
| Attrition rate - Managers | Operational Risk | People Risk | Employee turnover rate | Talentview |
| Attrition rate - Non Manager Personnel | Operational Risk | People Risk | Employee turnover rate | Talentview |
| Manager - Position Tenure | Operational Risk | People Risk | Employee turnover rate | Talentview |
| Manager - Job Tenure | Operational Risk | People Risk | Employee turnover rate | Talentview |
| NonManager - Position Tenure | Operational Risk | People Risk | Employee turnover rate | Talentview |
| NonManager - Job Tenure | Operational Risk | People Risk | Employee turnover rate | Talentview |
| # of approved projects | Operational Risk | Project Risk | PARs | |
| Total Expenditure Amount | Operational Risk | Project Risk | PARs | |
| % of material suppliers | Operational Risk | Third Party | Third Party Risk | Archer |

FIG. 3

| AE | KRI_1 | KRI_2 | KRI_3 |
|---|---|---|---|
| 1 | 25 | 60 | 1 |
| 2 | 30 | 55 | 4 |
| 3 | 32 | 50 | 5 |
| 4 | 45 | 45 | 3 |
| 5 | 29 | 40 | 7 |
| 6 | 50 | 35 | 9 |
| 7 | 75 | 30 | 10 |
| 8 | 37 | 25 | 16 |
| 9 | 60 | 15 | 2 |
| 10 | 45 | 10 | 5 |

| AE | KRI_1 | KRI_2 | KRI_3 |
|---|---|---|---|
| 1 | 0 | 10 | 0.00 |
| 2 | 1 | 9 | 2.00 |
| 3 | 1.4 | 8 | 2.67 |
| 4 | 4 | 7 | 1.33 |
| 5 | 0.8 | 6 | 4.00 |
| 6 | 5 | 5 | 5.33 |
| 7 | 10 | 4 | 6.00 |
| 8 | 2.4 | 3 | 10.00 |
| 9 | 7 | 1 | 0.67 |
| 10 | 4 | 0 | 2.67 |

| AE | KRI_1 | KRI_2 | KRI_3 |
|---|---|---|---|
| 1 | L | H | L |
| 2 | L | H | L |
| 3 | L | H | L |
| 4 | M | H | L |
| 5 | L | M | M |
| 6 | M | M | M |
| 7 | H | M | M |
| 8 | L | L | H |
| 9 | H | L | L |
| 10 | M | L | L |

Example of how raw values are rescaled and then converted to low, medium, and high ratings.

| AE | KRI_1 | KRI_2 | KRI_3 | SUM | RESCALED | LEVELS |
|---|---|---|---|---|---|---|
| 1 | 0 | 10 | 0.00 | 10.00 | 2.5 | L |
| 2 | 1 | 9 | 2.00 | 12.00 | 4 | M |
| 3 | 1.4 | 8 | 2.67 | 12.07 | 4.05 | M |
| 4 | 4 | 7 | 1.33 | 12.33 | 4.25 | M |
| 5 | 0.8 | 6 | 4.00 | 10.80 | 3.1 | L |
| 6 | 5 | 5 | 5.33 | 15.33 | 6.5 | M |
| 7 | 10 | 4 | 6.00 | 20.00 | 10 | H |
| 8 | 2.4 | 3 | 10.00 | 15.40 | 6.55 | M |
| 9 | 7 | 1 | 0.67 | 8.67 | 1.5 | L |
| 10 | 4 | 0 | 2.67 | 6.67 | 0 | L |

Following from the example above, we are now aggregating those values to compute the overall subrisk level. We take the sum of the three KRI values, rescaled them to fit between 0 and 10, and then assign them to their risk scores.

FIG. 6

| AE | SR_1 | SR_2 | SR_3 | SR_4 | SR1_VALUE | SR2_VALUE | SR3_VALUE | SR4_VALUE | SUM | RESCALED | LEVEL |
|---|---|---|---|---|---|---|---|---|---|---|---|
| 1 | L | H | L | H | 1 | 3 | 1 | 3 | 8 | 5 | M |
| 2 | L | H | L | L | 1 | 3 | 1 | 1 | 6 | 0 | L |
| 3 | L | H | L | H | 1 | 3 | 1 | 3 | 8 | 5 | M |
| 4 | M | H | L | H | 2 | 3 | 1 | 3 | 9 | 7.5 | H |
| 5 | L | M | M | M | 1 | 2 | 2 | 2 | 7 | 2.5 | L |
| 6 | M | M | M | M | 2 | 2 | 2 | 2 | 8 | 5 | M |
| 7 | H | L | M | H | 3 | 1 | 2 | 3 | 10 | 10 | H |
| 8 | L | L | H | L | 1 | 1 | 3 | 2 | 7 | 2.5 | L |
| 9 | H | L | L | M | 3 | 1 | 1 | 2 | 6 | 0 | L |
| 10 | M | L | L | M | 2 | 1 | 1 | 2 | 6 | 0 | L |

Table 5: Sample calculations to calculate principal risk levels from subrisk levels. Subrisk scores were first converted to 1, 2, and 3 from low, medium, and high respectively. The sum of the values were then taken and rescaled to lie between 0 and 10. The rescaled values were then converted to levels.

FIG. 7

| | TREND | | CUMULATIVE LOSS AMOUNG | | HEADLINE | Loss Amount |
|---|---|---|---|---|---|---|
| Pandemic (Economic Impact) | ⊕ | ~ | $$$ | Company 1 | Company cofounder warns coronavirus will cause the worst bear market in my lifetime | $$$ |
| | | | | Company 2 | Dow plunges 974 points after president warns of painful times to come and a shocking coronavirus death toll | $$$ |
| | | | | Company 3 | Biggest banks were hit with a warning to freeze their dividends during the Covid 10 uncertainty or face formal action | $$$ |
| Processing Errors | ⊕ | ~ | $$$ | Company 4 | Bank branch in San Francisco left unlocked outside of opening hours | $$$ |

SYSTEMS AND METHODS OF DYNAMICALLY PRESENTING DATASETS IN A GRAPHICAL USER INTERFACE

CROSS REFERENCE TO RELATED APPLICATIONS

This application claims priority from U.S. provisional patent application No. 62/896,239, entitled "SYSTEMS AND METHODS OF DYNAMICALLY PRESENTING DATASETS IN A GRAPHICAL USER INTERFACE", filed Sep. 5, 2019, the entire contents of which are hereby incorporated by reference herein.

This application also claims priority from U.S. provisional patent application No. 63/056,388, entitled "SYSTEMS AND METHODS OF DYNAMICALLY PRESENTING DATASETS IN A GRAPHICAL USER INTERFACE", filed Jul. 24, 2020, the entire contents of which are hereby incorporated by reference herein.

FIELD

Embodiments of the present disclosure generally relate to the field of data record management, and in particular to systems and methods of dynamically determining data operations based on a plurality of data records and presenting the same in a dynamic user interface.

BACKGROUND

Computing systems may be configured to conduct computing processes associated with one or more data records. As an illustrating example, a banking institution may operate a computing system for storing a plurality of data records, and the plurality of data records may be associated with operational events associated with one or more entities. On a periodic basis (e.g., yearly basis), the banking institution may conduct audit operations on the data records associated with operational events to identify or ameliorate operational event abnormalities. Operational event abnormalities may be represented by events occurring beyond a threshold value. In some examples, the banking institution may identify operational event abnormalities associated with operational abnormalities, reputational abnormalities, credit abnormalities, regulatory compliance deviations, or other types of abnormalities, risks, instability, or uncertainty deviating from a predetermined threshold.

SUMMARY

The present disclosure describes data processes or data operations that may include audit operations associated with a plurality of data records of a plurality of entities. In some scenarios, a banking institution may conduct analysis of a plurality of data records retrieved from a plurality of data record sources and may determine a set of audit operations at a predetermined point in time (e.g., once a year). As a result, the set of audit operations may represent audit operations based on operational events at a static point in time. Further, the conducted analysis for determining the set of target audit operations may be based on subjective judgment or skill of a team of auditors.

As the analysis for determining target audit operations for the upcoming year are "set in stone" on a yearly basis, it may be challenging to dynamically alter the determined audit operations at least because any changes to the target audit operations may need to be based on subjective judgment or skill of a team of auditors based on voluminous analysis of the plurality of data records. Further, such example processes may not be suitable for re-determining, in substantially real-time or dynamically, target audit operations in response to substantial changes in operational events among entities of a plurality of data records.

It may be beneficial to provide systems and methods configured to dynamically recommend audit operations on a real-time or near real-time basis when an event, such as a pandemic (e.g., COVID-19 outbreak) or increase/decrease in volume of event data metrics, may cause widespread changes to operational events throughout the world. In some embodiments, systems and methods disclosed herein may dynamically recommend data processes executable at one or more networked computing resources based on temporal changes to data records associated with operational events of entities. In some embodiments, systems and methods disclosed herein may dynamically generate updated priority queues for recommending scheduled data operations for the plurality of datasets. The priority queues showing scheduled data operations may be provided as a plan for display at a computing device. In some embodiments, computing devices may conduct objective data processes for identifying operational event abnormalities to mitigate or ameliorate effects of material events, such as a pandemic that causes changes to events represented by data records.

In some embodiments, computing devices may be configured to monitor event data associated with data records. The computing devices may monitor event data based on one or more threshold values. In one example, when event data meets a first threshold value (e.g., when there may be an unexpected increase in volume of near-field communication related banking transactions), the computing device may be configured to dynamically generate an updated priority queue for scheduling audit operations, such that prioritization of near-field communication related banking transactions may now be audited sooner as compared to in-person banking transactions at a brick-and-mortar bank branch (as a non-limiting example)

In another example, the computing device may evaluate event data based on two or more threshold values. For example, the computing device evaluation of event data may be based on a first sub-threshold value and a second sub-threshold value. In response to detecting event data meeting the first sub-threshold value, the computing device may generate a signal for transmitting to a client device a notification message, in substantially real-time, indicating an unanticipated increase or decrease in event data metrics. The notification message may be configured to indicate an unplanned acceleration in activity volume or metric change and provide an administrator device advanced notice of an impending priority queue update.

In response to detecting event data meeting the second sub-threshold value, the computing device may generate the updated priority queue for scheduling the data operations. For example, the updated priority queue may be associated with re-ordering or modifying audit operation plans. To illustrate, prior to a priority queue update, the computing device may be configured to generate audit plans to conduct audits associated with near-field communication transaction data before online banking transaction data. Following a priority queue update, the computing device may generate audit plans to conduct audits associated with online banking transaction data before near-field communication transaction data.

Accordingly, some embodiment systems described in the present disclosure may, in response to event data meeting one or more thresholds, generate notifications of potential priority queue updates and/or generate updated priority queues for scheduling audit operations associated with data records.

In one aspect, the present disclosure provides a system that may include: a processor; and a memory coupled to the processor. The memory may store processor-executable instructions that, when executed, configure the processor to: detect event data meeting a threshold value for identifying a shift in data operation relevance; based on the event data, traversing a cascading data structure to identify an auditable entity corresponding to one or more data records associated with the event data, the one or more data records corresponding to at least one branch of the cascading data structure; generate an updated priority queue for scheduling data operations based on priority weights associated with one or more branches of the cascading data structure, the updated priority queue based on event data corresponding to the identified auditable entity relative to event data associated with one or more records corresponding to other auditable entities; and transmit a signal for dynamically communicating the updated priority queue for scheduling data operations associated with data records of respective auditable entities.

In another aspect, the present disclosure provides a method that may include: detecting event data meeting a threshold value for identifying a shift in data operation relevance; based on the event data, traversing a cascading data structure to identify an auditable entity corresponding to one or more data records associated with the event data, the one or more data records corresponding to at least one branch of the cascading data structure; generating an updated priority queue for scheduling data operations based on priority weights associated with one or more branches of the cascading data structure, the updated priority queue based on event data corresponding to the identified auditable entity relative to event data associated with one or more records corresponding to other auditable entities; and transmitting a signal for dynamically communicating the updated priority queue for scheduling data operations associated with data records of respective auditable entities.

In another aspect, a non-transitory computer-readable medium or media having stored thereon machine interpretable instructions which, when executed by a processor may cause the processor to perform one or more methods described herein.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the present disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 3 illustrates a table illustrating example key risk indicator metrics associated with principle risk and sub-risk categories, in accordance with an embodiment of the present disclosure;

FIG. 6 illustrates a table showing aggregating data values to determine an overall sub-risk level, in accordance with an embodiment of the present disclosure;

FIG. 7 illustrates a table of a series of operations for calculating principle risk levels from sub-risk levels, in accordance with an embodiment of the present disclosure;

FIG. 15 illustrates a graphical user interface, in accordance with an embodiment of the present disclosure.

DETAILED DESCRIPTION

Figure 1:
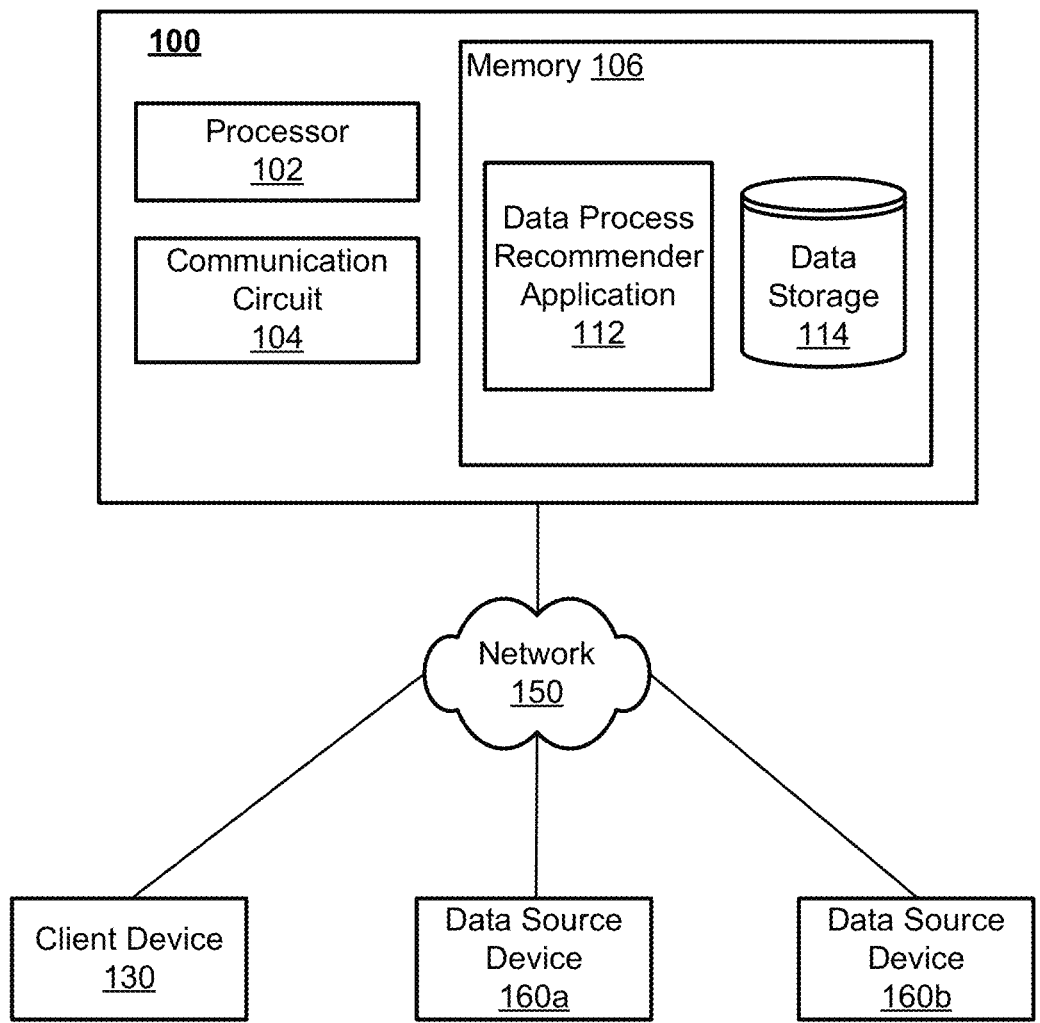
FIG. 1 illustrates a system, in accordance with an embodiment of the present disclosure.

Systems and methods of recommending data operations based on a plurality of data records associated with operational events are described in the present disclosure. In some embodiments, the systems and methods may generate a priority queue for scheduling data operations associated with data records. To illustrate embodiments, examples of banking institution systems and processes may be disclosed. It may be appreciated that systems and methods of generating recommending or scheduling data process sequences in other types of systems or environment processes may be contemplated.

A banking institution may operate systems for storing data records associated with operational events of one or more entities. In some embodiments, the plurality of data records may be associated by a cascaded data structure. The cascaded data structure may associate the plurality of data records in a hierarchal relationship. On an annual basis, or any other periodic basis, the banking institution may determine a schedule of data operations or data processes for identifying operational event abnormalities. In some examples, operational event abnormalities may include data records associated with strategic risk, reputational risk, operational risk, credit risk, regulatory compliance, or other uncertainty or instability. In some examples, operational event abnormalities may be associated with information technology system data, operational risk events, employee attrition, data privacy breaches, conduct breaches, among other types of events.

As non-limiting examples, data records may be configured to store text-based descriptions associated with operational risk events, such as data associated with identified fraud events, data associated with monetary loss associated with documented operational events, among other examples. In some embodiments, data records may be configured to store text-based descriptions associated with employee attrition rate, data associated with tracking employee tenure, among other examples. In some embodiments, data records may be configured to store text-based descriptions associated with information technology related data, such as computing system usage statistics, information technology related incident reports, among other examples. In some scenarios, audit operations may be mandated by regulatory laws or rules or may be scheduled due to identified heightened risk (e.g., systems risk, compliance risk, credit risk, etc.) based on analysis of vast volumes of data records.

In some examples, the data operations may include audit operations for the plurality of data records of a plurality of entities. In some scenarios, the banking institution may conduct analysis of a plurality of data records retrieved from a plurality of data record sources and may determine a set of audit operations once a year. As a result, the set of audit operations may represent audit operations based on operational events at a static point in time. Further, the conducted analysis for determining the set of target audit operations may be based on subjective judgment or skill of a team of auditors.

As the analysis for determining target audit operations for the upcoming year are "set in stone" on a yearly basis, it may be challenging to dynamically alter the determined audit operations at least because any changes to the target audit operations may need to be based on subjective judgment or skill of a team of auditors based on voluminous analysis of the plurality of data records. Further, such example processes may not be suitable for re-determining, in substantially real-time, target audit operations in response to substantial changes in operational events among entities of a plurality of data records.

In some situations, when a team of auditors of a banking institution determine target audit operations for the upcoming year, it may be challenging to dynamically re-determine a set of new target audit operations until the next yearly cycle at least because determining the target audit operations may require voluminous analysis, and such analysis may be based on subjective judgment or skill of the respective auditors. In some scenarios, determining target audit operations may require voluminous analysis on unstructured datasets.

It may be beneficial to provide systems and methods configured to dynamically recommend audit operations on a real-time or near real-time basis when an event, such as a pandemic (e.g., COVID-19 outbreak), may cause widespread changes to operational events throughout the world. In some embodiments, systems and methods disclosed herein may dynamically recommend data processes executable at one or more networked computing resources based on temporal changes or time-varying changes to data records associated with operational events of entities. The networked computing resources may conduct objective data processes for identifying operational event abnormalities to mitigate or ameliorate effects of material events, such as a pandemic that causes changes to events represented by data records.

In examples described herein, audit operations may include one or more of operations to evaluate adequacy/effectiveness of internal control systems, evaluate management and financial information systems, evaluate accuracy/reliability of accounting records and financial reports, evaluate operations for safeguarding assets, appraisal of operations efficiencies (e.g., of a banking institution), evaluate systems established to ensure compliance with legal or regulatory requirements, or other example operations for evaluating integrity of data record systems. In examples described herein, audit operations may be those for banking institutions subject to legal and regulatory framework or any other organizations that may be subject to laws or regulations.

In some embodiments of the present disclosure, data operations or data process segments may be associated with operations such as audit operations that may be executable by a networked computing resource. In some examples, data process segments may include an aggregation or a combination of operations executable based on a plurality of data records as a data set input for identifying abnormalities or deviations from expected objective metrics. In some embodiments, objective metrics may include key performance indicators. The data process segments may include computing operations for identifying potential credit card fraud, frequent occurrence of insurance claims, or other occurrences associated with a plurality of data records based on the plurality of data records. The respective data records may be associated with one or more entities, and the one or more entities may be associated with a position on a cascading data structure, such as a data tree structure or other hierarchical data structure.

Reference is made to FIG. 1, which illustrates a system 100, in accordance with an embodiment of the present disclosure. The system 100 may transmit or receive data messages via a network 150 to or from a client device 130 or one or more data source devices, such as a first data source device 160*a* and a second data source device 160*b*. A sole client device 130 and two data source devices are illustrated in FIG. 1; however, it may be understood that any number of client devices or data source devices may transmit or receive data messages to or from the system 100.

The network 150 may include a wired or wireless wide area network (WAN), local area network (LAN), a combination thereof, or other networks for carrying telecommunication signals. In some embodiments, network communications may be based on HTTP post requests or TCP connections. Other network communication operations or protocols may be contemplated.

The system 100 includes a processor 102 configured to implement processor-readable instructions that, when executed, configure the processor 102 to conduct operations described herein. For example, the system 100 may be configured to conduct operations for dynamically recommending data process segments associated with audit operations or other data operations executable at networked computing resources. In some embodiments, the dynamically recommended data process segments associated with audit operations or other data operations may be a displayed at a client device 130. In some examples, the processor 102 may be a microprocessor or microcontroller, a digital signal processing processor, an integrated circuit, a field programmable gate array, a reconfigurable processor, or combinations thereof.

The system 100 includes a communication circuit 104 configured to transmit or receive data messages to or from other computing devices, to access or connect to network resources, or to perform other computing applications by connecting to a network (or multiple networks) capable of carrying data.

In some embodiments, the network 150 may include the Internet, Ethernet, plain old telephone service line, public switch telephone network, integrated services digital network, digital subscriber line, coaxial cable, fiber optics, satellite, mobile, wireless, SS7 signaling network, fixed line, local area network, wide area network, or other networks, including one or more combination of the networks. In some examples, the communication circuit 104 may include one or more busses, interconnects, wires, circuits, or other types of communication circuits. The communication circuit 104 may provide an interface for communicating data between components of a single device or circuit.

The system 100 includes memory 106. The memory 106 may include one or a combination of computer memory, such as random-access memory, read-only memory, electro-optical memory, magneto-optical memory, erasable programmable read-only memory, and electrically-erasable programmable read-only memory, ferroelectric random-access memory, or the like. In some embodiments, the memory 106 may be storage media, such as hard disk drives, solid state drives, optical drives, or other types of memory.

The memory 106 may store a data process recommender application 112 including processor-readable instructions for conducting operations described herein. In some examples, the data process recommender application 112 may include operations for recommending data operations based on a plurality of data records associated with operational events. For example, operations of the data process recommender application 112 may generate a series or sequence of data process segments that may be associated with an audit process for the plurality of data records. In some embodiments disclosed herein, the data process recommender application 112 may include operations for determining priority values or priority weights for the respective plurality of data process segments. In response to signals representing significant operational events that may significantly impact operations of a banking institution (e.g., COVID-19 pandemic), a processor 102 may conduct operations for dynamically generating in real-time or near real-time updated audit plans based on determined priority values.

In another example, in response to signals representing an unanticipated increase in volume of a particular type of event (e.g., transactions by near-field "tap" communication technology), the processor 102 may conduct operations for dynamically recommending priority queues for audit operations. Updates to priority queues for audit operations may include updating frequency of audit operations, urgency/sequence of audit operations of one service as compared to another service, substance of audit operations, or other adjustments responsive to dynamically changing events.

As an illustrating example, prior to the COVID-19 pandemic, a banking institution may conduct audit operations for detecting bank draft/bank cheque fraud. As paper-based instruments are less likely to be used during the COVID-19 pandemic (e.g., banking institution branches are closed or have reduced operations to promote social distancing measures), it may be desirable for the banking institution to expediently identify the change in operational circumstances and re-focus finite resources for conducting audit operations for other areas, such as detecting online-banking fraud.

The system 100 includes data storage 114. In some embodiments, the data storage 114 may be a secure data store. In some embodiments, the data storage 114 may store data records received from data source devices (160a, 160b), data received from data source devices for populating data records, or other data sets associated with entities of an entity universe or auditable universe (AU).

In some scenarios, processor operations for random sampling of data sources may not provide a sufficient dataset granularity for identifying trends or for predicting changes. Accordingly, it may be beneficial to provide a data storage 114 associated with one or more data lakes. The data storage 114 may be configured to access data sets from a plurality of data source devices (160a, 160b). Accordingly operations described herein may be based on full data sets from data source devices for identifying outlier data points for providing analysis baseline metrics.

In some embodiments, a plurality of data records may respectively be associated with an entity in an auditable universe (AU). The plurality of data records may be organized based on a data tree structure, including a plurality of entity levels, entity sub-levels, or the like. The entity levels or entity sub-levels may be associated with groupings of entities by geographical region, by operational function, by business cost center/transit structure, among other types of entity groupings. As an illustrating example, the data tree structure may be an 80K Roll Up structure configured by a banking institution for generating reports associated with data records associated to one or more positions on the 80K Roll Up structure. Each respective entity in the auditable universe may be associated with a position on the 80K Roll Up structure.

In some embodiments, systems may be configured to determine audit operations for a grouping of entities of the plurality of entities (e.g., a group of entities associated with an entity level). An example 80 k Roll Up structure that may be configured by banking institutions for reporting operations. In some scenarios, a plurality of entities may be known as an Auditable Universe (AU), and auditable entities may be associated to one or more positions on the 80 k Roll Up structure. As auditable entities may be associated with a position on the data tree structure, in some embodiments, operations described herein may be configured to determine audit operations for auditable entities at particular entity levels represented on the 80 k Roll Up structure. In some examples, signals representing new operational events may be used to determine key risk indicators, key performance indicators, or other data record attributes.

The client device 130 may be a computing device, such as a mobile smartphone device, a tablet device, a personal computer device, or a thin-client device. The client device 130 may be configured to transmit messages to/from the system 100 for dynamically signalling operations for generating a plurality of data process segments for one or more data records (e.g., generate an audit plan for data records of a banking institution).

Respective client devices 130 may include a processor, a memory, or a communication interface, similar to the example processor, memory, or communication interfaces of the system 100. In some embodiments, the client device 130 may be a computing device associated with a local area network. The client device 130 may be connected to the local area network and may transmit one or more data sets or signals to the system 200.

The data source devices (160a, 160b) may be computing devices, such as data servers, database devices, or other data storing systems associated with resource transaction entities. For example, the data source device 160a may be associated with a banking institution providing banking accounts to users. The banking institutions may maintain bank account data sets associated with users of client devices 130, and the bank account data sets may be a record of monetary transactions representing credits (e.g., salary payroll payments, etc.) or debits (e.g., payments from the user's bank account to a vendor's bank account). As non-limiting example, the second data source device 160b may be associated with a database storing employee data records. In some other examples, data source devices may be associated with a database storing data associated information technology malfunction events or data associated with banking system failures. Other examples of data records may be contemplated.

In some embodiments of the present disclosure, the system 100 may be configured to conduct operations dynamically recommending data processes or data operations based on a plurality of data records associated with operational events. The recommended data processes may be associated with audit operations.

Continuing with examples of banking institution systems, systems may have finite computing resources for conducting audit operation processes. Accordingly, it may be beneficial to dynamically reallocate, in real-time or near real-time, data processes in response to changes substantially affecting operational events. For example, the banking institution systems may benefit from more efficient use of audit operation resources for detecting online-banking fraud rather than for detecting paper-based currency fraud during a pandemic period. It may be appreciated that during a global pandemic period, use of paper-based currency may dramatically decrease during times of widespread social distancing and the risk of paper-based currency fraud may be reduced in comparison to online-banking fraud.

Figure 2:
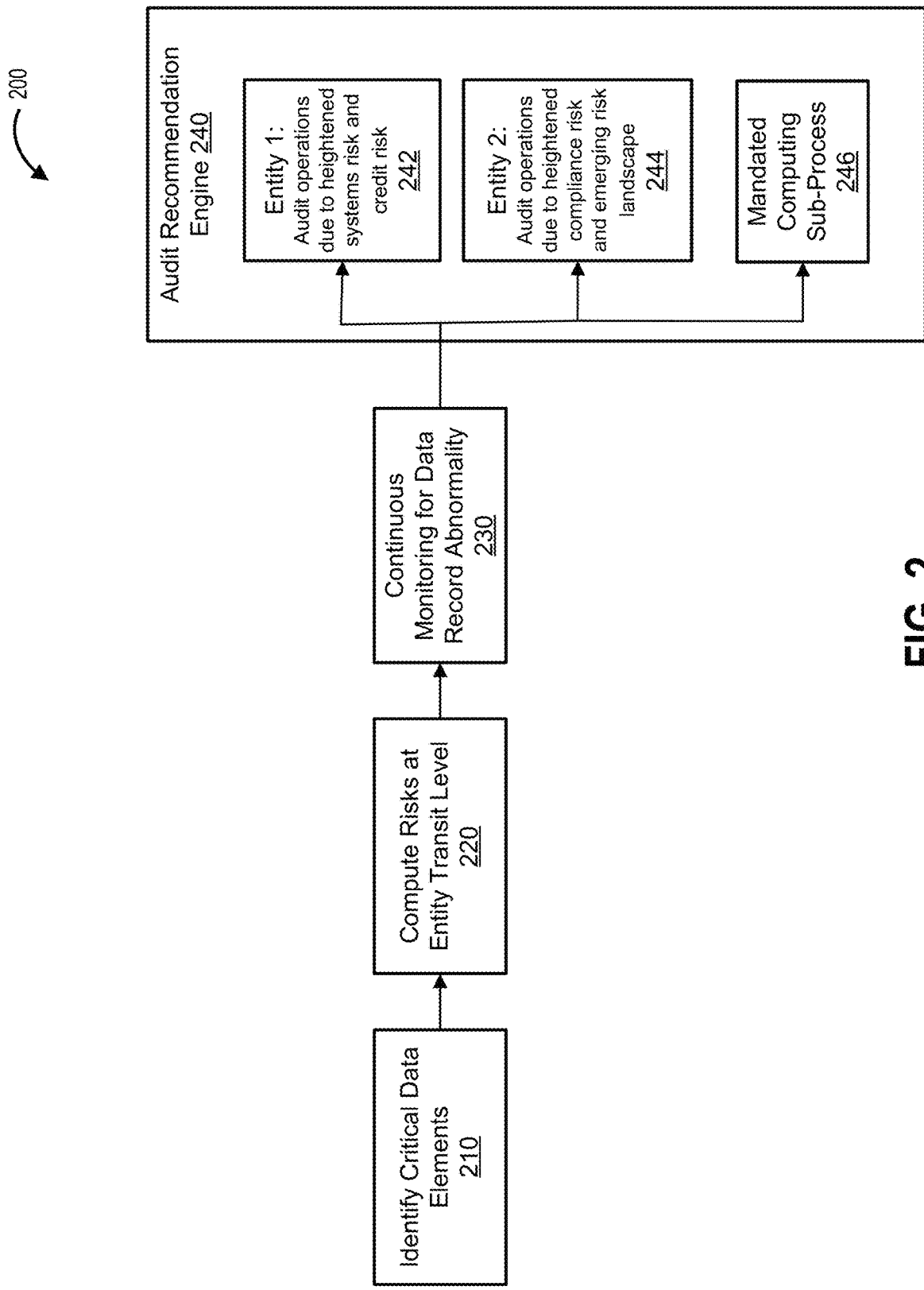
FIG. 2 illustrates a block diagram of a process of dynamically generating audit computing process recommendations, in accordance with an embodiment of the present disclosure.

Reference is made to FIG. 2, which illustrates a block diagram 200 of a process of dynamically generating audit computing process recommendations, in accordance with an embodiment of the present disclosure. The block diagram 200 may be based on a banking institution server for recommending audit data process operations. The banking institution server may be associated with a finite quantity of resources, and it may be desirable to determine data processes associated with an audit plan based on a current state of the banking institution's tolerance for abnormalities, risks, or other uncertainties. The process illustrated in FIG. 2 may be associated with operations of the system 100 (FIG. 1) or other computing devices.

At process 210, the system 100 may obtain datasets or data records from one or more data source devices (160a, 160b) and may generate data outputs based on the datasets. As an example, the system 100 may obtain datasets via a data science platform (e.g., Dataiku) as part of a data ingestion step. In some embodiments, data sets may be associated with periodic data dumps or shared folders associated with one or more entities associated with a data tree structure.

In some embodiments, the system 100 may obtain data sets from human resource databases, such as Talentview, and such data sets may be obtained on an ad hoc basis or on a periodic time schedule. Other types of data sets may be received via other communication mediums.

The system 100 may obtain datasets and may process the datasets for mapping to nodes of data tree structure, such as an 80 k Roll Up structure or other cascading data structure. As an example, a data record associated with an employee of the banking institution may be "rolled up" to an organizational unit or cost center of the banking institution and may be associated with an 80 k hierarchy unit suitable for "look-up". In some embodiments, entities of an auditable entity may be mapped to the data tree structure, and entities may be associated with an entity level. In some embodiments, the system 100 may determine audit plans for a particular entity level associated with a group of auditable entities.

In some embodiments, at operation 210, the system may process obtained data sets and determine at least one of attributes or key risk indicators. As an illustrating example, attributes may be data points that may inform an audit operation assessment process. For instance, attributes may be associated with data representing the number of audit issues previously raised for an entity or entity level or with data associated with a relation of one auditable entity relative to another auditable entity. The system 100 may conduct operations based on attributes for comparing auditable entities with similar risk levels. For instance, in scenarios where multiple auditable entities may be trending towards a "high risk" designation, the system 100 may conduct data process operations for comparing the size or materiality of the auditable entity.

In some embodiments, the system 100 may determine key risk indicator data points for indicating a risk profile of a particular AE. In some scenarios, key risk indicator data may be associated with a particular entity level (e.g., roll-up), and the key risk indicator data may be associated with each parent-child link in the data tree structure. In some embodiments, the key risk indicator data may be associated with a principal risk, a sub-risk, or other values. As an example, reference is made to FIG. 3, which illustrates a table 300 illustrating key risk indicator metrics associated with associated principle risk and sub-risk categories.

In some embodiments of systems storing data records according to an 80 k Roll Up structure, if data records may be rolled up in the hierarchy, the system may determine or retrieve key risk indicator values associated with particular auditable entities. In scenarios where data records may not yet be "rolled up", the system may conduct operations to traverse the hierarchy from a lowest terminal node up to the 80,000 enterprise node or a desired node (or branch). At each parent-child link, the system 100 may conduct operations to add up values from child nodes to a parent. Accordingly, an 80,000 enterprise node may be the sum of values associated with all children nodes, child nodes of the children nodes, etc. In some scenarios, once the system 100 have rolled up data record values, the system 100 may retrieve values for entity levels (e.g., transits of an organization) that are associated with an auditable entity. In some embodiments, the rolled up data record values associated with an auditable entity node may be an combination of key risk indicator values, and the system 100 may be configured to compare key risk indicator values associated among different auditable entities for updating priority queues for scheduling data operations associated with data records.

In some scenarios of a cascading data structure, some auditable entities may be associated with multiple transits. The system 100 may aggregate values such that there may be one data record value for an auditable entity in a period of time prior to downstream calculations.

Continuing with the foregoing example, the system 100 at process 220 may conduct operations to compute risks at a particular transit level, develop baseline metrics, or identify unusual trends. In some embodiments, metrics may be computed based on an annual quarterly basis. In some examples, this computational strategy may allow sufficient aggregation of key performance indicators and key risk indicators for auditable entities.

In some embodiments, the system 100 may conduct operations for computing quarter-over-quarter changes. In some examples, the system 100 may conduct operations to compute a raw delta or conduct operations to compute a percent increase. To illustrate, where a number of operational risk events for a particular auditable entity in 2019Q1 and 2019Q2 are 25 and 50, respectively, the delta between the quarters is 25 and the percentage increase is 100%.

In some embodiments, the system 100 may conduct operations for computing moving averages for determining relative risk measures. Such embodiment operations may provide data measures that may be aberrant to one-off events and may integrate recent historic values while smoothing out variances to improve delta calculations.

As an illustrating example, the system 100 may determine two types of moving averages: (1) short-term four quarter moving average; or (2) mid-term eight quarter moving average. Both moving average calculations may lag by one quarter (e.g., 3 months) at least because the system 100 may conduct operations to calculate deltas between the moving averages and the quarterly value (moving average deltas, DMs), and may thereby reduce information leakage. To illustrate, reference is made to FIG. 4, which illustrates a table 400 of example indicator values alongside moving-average values and a plot of data associated with the tabular data illustrating the sample indicator values/moving average data.

Figure 4:
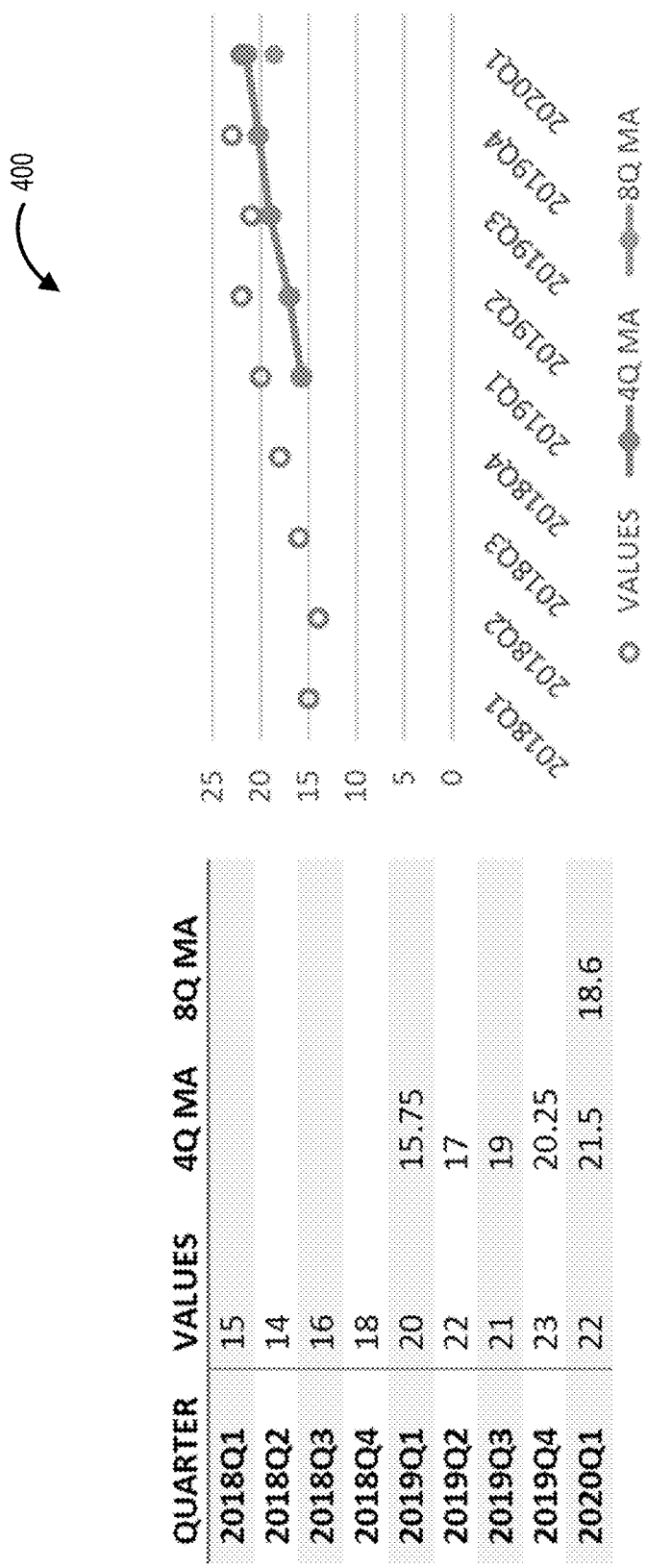
FIG. 4 illustrates a table of example indicator values alongside moving-average values and a plot of data associated with the tabular data, in accordance with an embodiment of the present disclosure.

In the illustrated table 400 of FIG. 4, the 4Q moving average for 2019Q1 may be calculated based on data from 2018Q1 to 2018Q4. In the present example, if the system determined the moving average values based on the 2019Q1 value, the output delta value may be biased. Accordingly, the system 100 may conduct operations for computing data for "given the historic data, the value for the current quarter may be X", and the computed delta value may indicate "this is how much our observed values deviate from the expected value".

In the present example, as the system 100 conducts operations with further data sets, observed values and the four quarter moving average may converge, indicating stability at a higher level. This may illustrate a new "business as usual" or baseline value.

In some scenarios, auditors may draw several insights from operations for determining moving averages. In the example of the illustrated table, in 2019Q1, there may be a relatively large difference between the moving average and the observed value, thereby indicating that based on historic data values the particular 3 month period experienced a large increase in number of events. By comparison, in 2020Q1, the observed difference between the 4Q moving average and the observed value appears to be small. While there may be no new risks, the indication that the moving average may not be decreasing may indicate that audit operations for looking at existing controls may be warranted to improve processes.

In some situations, the system 100 may conduct operations for computing 8Q moving averages, such that output data may provide an indication to the query: "in the past two years, there has been an observed average number of occurrences and the current quarter deviates from it. Does this pose a risk to the enterprise and is intervention and audit required?" In some embodiments, the system 100 may conduct operations for computing trending statistical data to provide explainability of anomaly detection.

Continuing with the aforementioned example, audit operation resources at a banking institution may be finite. It may be beneficial to allocate resources associated with audit operations to auditable entities where risk may be relatively high. Accordingly, the system 100 may be configured, at operation 220, to assign relative risk scores to auditable entities. In some embodiments, operations of a bottom-up approach may include assessing key risk indicators, assessing sub-risk, or assessing principle risk (e.g., from FIG. 3). In some scenarios, principal risks may be assessed without weights. In some scenarios, the banking institution may have varying risk appetites for different types of risk and the weightings may be assigned to associate with varying risk appetites.

In some embodiments, the system 100 may conduct operations to determine levels for a key risk indicator. The system 100 may obtain key risk indicator data values from a plurality of auditable entities of the platform. In some examples, key risk indicators may be associated with moving average delta values or actual observed values. In some embodiments, where a range of key risk indicator values exceed 100, the system 100 may determine that there may be outliers. The data values may be rescaled such that there may be no negative values. In some examples, the system 100 may conduct operations to take a logarithm base 10 of data values. Data values may be rescaled to be between 0 and 10 (lower number indicates lower risk) to provide a scaled risk score. In some examples, directionality of the key risk indicator may be considered during the rescaling, as some key risk indicator values may indicate lower risk if they are smaller, or higher, or with the least deviation from the baseline.

In some embodiments, a key risk indicator value may be assigned a low risk rating when the scaled risk score may be between 0 and 3.3, a medium risk rating when the scaled risk score may be between 3.3 to 6.6, and high risk rating when the value may be between 6.6 and 10. The example computations may be conducted for all key risk indicators of sub-risk indicators. For instance, to determine a relative risk score for a sub-risk, the system 100 may conduct operations to tally up the scaled risk scores and rescale the values between 0 and 10 and repeat assignments of risk ratings as described above.

Figure 5:
FIG. 5 illustrates a table of example key risk indicators associated with auditable entities associated with a cascading data structure, in accordance with an embodiment of the present disclosure.

Reference is made to FIG. 5, which illustrates a table 500 of key risk indicators associated with auditable entities associated with a cascading data structure (e.g., 80 k roll-up structure). The example illustrated in FIG. 5 shows how a raw key risk indicator values may be rescaled and mapped to risk rating categories.

Reference is made to FIG. 6, which illustrates a table 600 showing aggregating data values to determine an overall sub-risk level. A sum of three key risk indicator values may be rescaled to fit between 0 and 10, and assigned to risk level categories.

In some embodiments, the system 100 may conduct operations to level assignments to principal risk, thereby preventing a single sub-risk from dominating a calculation of a principal risk. For instance, when a data set includes eight key risk indicators for people sub-risk and two key risk indicators for information technology sub-risk, values of the people sub-risks may skew determining values of the information technology sub-risk. Accordingly, the system 100 may conduct operations based on rank sums to compute an overall principal risk. For each of the sub-risks, the system 100 may conduct operations based on assigned risk level categories, assign numeric values to the risk level categories (e.g., L=1, M=2, and H=3). The sum of assigned numeric values may be rescaled to be between 0 and 10, and a subsequent risk level category may be assigned.

As an illustrating example, FIG. 7 illustrates a table 700 of a series of example operations to calculate principle risk levels from sub-risk levels. In the present example, sub-risk scores may be converted to a numeric value from the categories of low, medium, and high. The sum of the values may be rescaled to lie between 0 and 10. The rescaled values may then be converted to levels.

Referring again to FIG. 2, based on risk ratings for principal risks, the system 100 at operation 230 may conduct operations to continuously or dynamically conduct risk assessment monitoring for detecting abnormalities in data recorded in a plurality of data records. In some embodiments, the system 100 may conduct operations based on trigger events or based on periodic time periods (e.g., daily, weekly, monthly, quarterly, or any other time period).

At operation 240, the system 100 may conduct operations to provide audit plan recommendations based on example operations described herein. The audit plan recommendation may be based on a generated priority queue for scheduling data operations associated with data records corresponding ton one or more associated entities.

As an illustrating example, the system 100 may determine or identify a plurality of data process segments based on one or more of operation 210, operation 220, or operation 230 and may identify a plurality of data process segments 242 associated with an audit plan for "entity 1". The plurality of data processes may include an audit plan of operations based on identified heightened system risk or credit risk.

As another illustrating example, the system 100 may determine or identify a plurality of data process segments 244 associated with an audit plan for "entity 2". The audit plan may include operations based on identified heightened compliance risk or emerging risk.

Further, the system 100 may determine or identify a plurality of data process segments associated with regulatory mandated audits 246, such as annual regular attestation requirements. Other examples of audit recommendation output may be contemplated.

It may be appreciated that conducting data operations for analyzing voluminous datasets or sets of data records may be resource intensive, and it may be prohibitive to conduct on-demand or substantially real-time dataset analysis for updating scheduled data operations, such as audit operations, associated with data records on unstructured voluminous datasets. Further, it may be prohibitive to conduct real-time dataset analysis in response to a trigger event when scheduled data operations may be generated or determined based on subjective skill or analysis data records.

Figure 8:
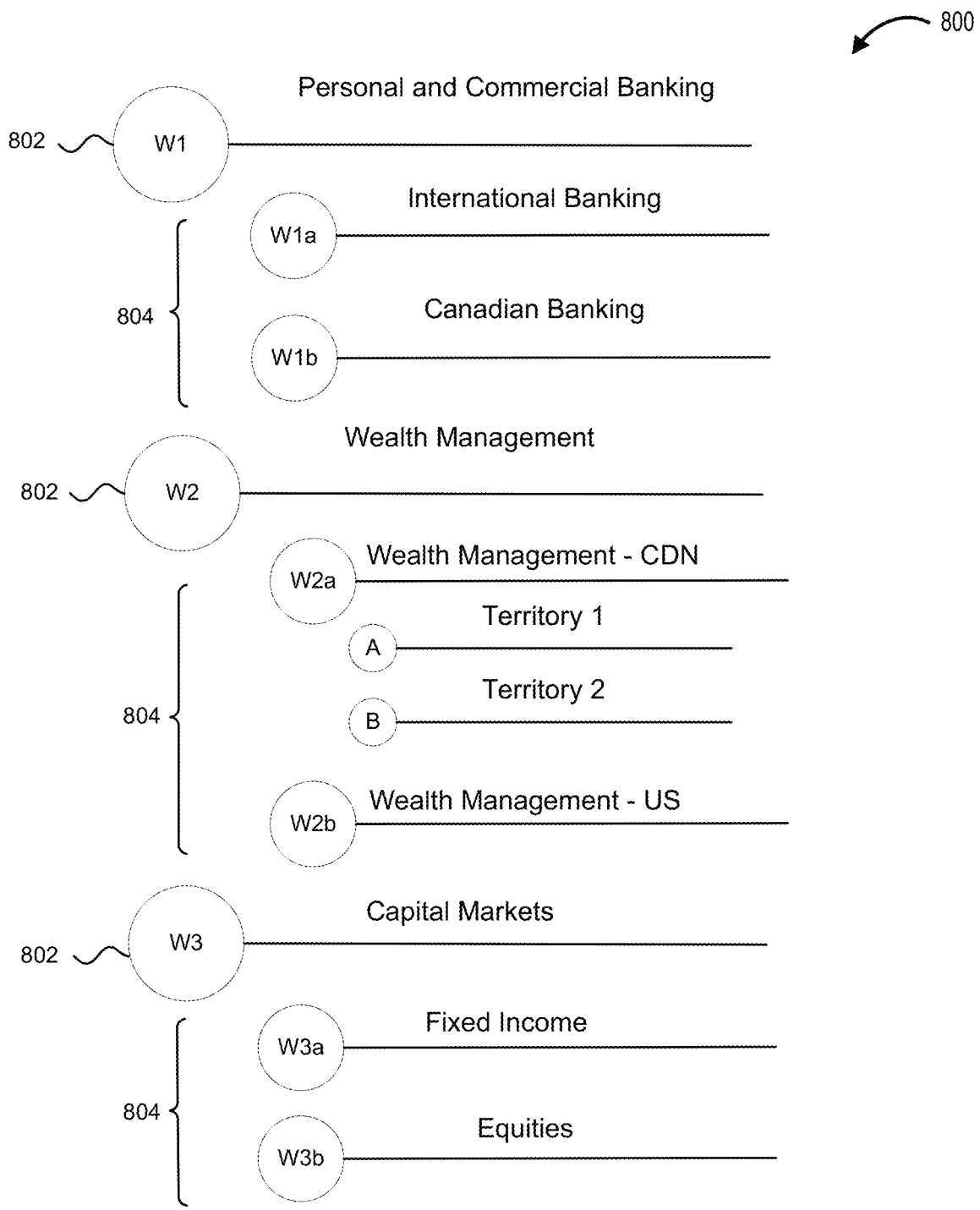
FIG. 8 illustrates a portion of a cascading data structure, in accordance with an embodiment of the present disclosure.

Reference is made to FIG. 8, which illustrates a portion of a cascading data structure 800, in accordance with an embodiment of the present disclosure. For ease of exposition, the cascading data structure 800 may represent a portion of or a simplified version an 80 k roll up structure, a tree data structure, or any other hierarchical data structure for organizing associations between a plurality of data sets. In some embodiments, the cascading data structure 800 may include numerous branches, sub-branches, sub-sub-branches, etc., and may include numerous data records or datasets derived from or stored in a data lake.

In some embodiments, datasets or data records associated with branches or nodes of the cascading data structure 800 may be stored at the data storage 114 of the system 100 or may be dynamically received, from one or more of the data source devices (160a, 160b), at the system 100.

The cascading data structure 800 in FIG. 8 shows three example auditable entities represented by three branches or nodes 802, such as a "Personal and Commercial Banking" entity, a "Wealth Management" entity, and a "Capital Markets" entity. The respective auditable entities (represented by a respective branch 802) may be associated with sub-branches, and one or more of the sub-branches may include sub-branches. For example, the "Wealth Management" entity may include sub-branches 804 associated with "Wealth Management—CDN" and "Wealth Management—US". Further, the entity "Wealth Management—CDN" may include further "Territory 1" and "Territory 2" entities represented by sub-branches of sub-branches. It may be appreciated that the cascading data structure 800 is excerpted for ease of exposition; and the cascading data structure 800 may be an extensive array of branches, sub-branches, sub-sub-branches, etc.

In some examples, associating entities or sub-entities based on a cascading data structure may be beneficial for efficiently traversing the cascading data structure to locate one or more data records. In some situations, data operations, such as audit operations, may be applicable to entity groupings, such as an auditable entity. For example, regulatory audit operations may be applicable to "Personal and Commercial Banking" as a whole, and it may be inefficient or non-sensual to apply regulatory audit operations at a sub-entity level. Accordingly, in some examples, systems may be configured to schedule data operations associated with data records at an "auditable entity" level (e.g., determined top-level entity) of the cascading data structure 800.

Continuing with the above-described examples of conducting audit operations associated with data records, as computing resources or resources in general may be finite resources, it may not be feasible or desirable to conduct audit operations on data records associated with all auditable entities at a given time. It may be beneficial to provide systems and methods for generating priority queues for scheduling data operations associated with data records corresponding to one or more branches of a cascading data structure. In some embodiments, the generated priority queues for scheduling data operations may be based on priority weights associated with branches or nodes associated with entity groups represented by the cascading data structure. In some embodiments, the respective branches, sub-branches, sub-sub-branches, etc. of the cascading data structure 800 may correspond with priority weights.

In some embodiments, priority weights may be based on event data associated with data records of respective branches of the cascading data structure. As an illustrating example, priority weights may be frequency index values representing a frequency count of identified events (e.g., reported fraud/security event) or may be relative indicator scores associated with operational risk events associated with banking operations.

In some embodiments, the plurality of priority weights associated with respective branches 802 or sub-branches 804 may be relative weights for biasing advanced scheduling of data operations based on a triggering time-varying event.

In some embodiments, priority sub-weights (e.g., $W1a$, $W1b$, $W2a$, A, B, etc.) may represent weight values for respective sub-branches. In some embodiments, a priority weight associated with an auditable entity (e.g., "Personal and Commercial Banking" entity) may include a combination of weights of sub-branches (e.g., priority sub-weights).

In some scenarios, events may cause scheduled data operations (e.g., audit operations) to be less relevant. For example, events may include an emergence of a global pandemic, such the COVID-19 pandemic. Such emergence of unexpected events may cause existing/scheduled audit operations, which may have been scheduled several months prior, to be of less relevant importance. For example, with promotion of social distancing to reduce the chance of spreading a virus, audit operations associated with data records for detecting paper cheque fraud may be less important or less urgent, as in-person banking using physical banking instruments would be less common. With promotion of social distancing, however, a banking institution may experience a rapid increase in on-line banking transactions, thereby causing audit operations associated with data records for detecting online banking fraud to emerge as an increasingly important audit operation to conduct to conduct on a more frequent or urgent basis. Accordingly, embodiment systems described herein may be configured to update priority queues for scheduling data operations associated with data records (e.g., updating priority queues to indicate increased priority for auditing transactional data from online banking usage).

Figure 9:
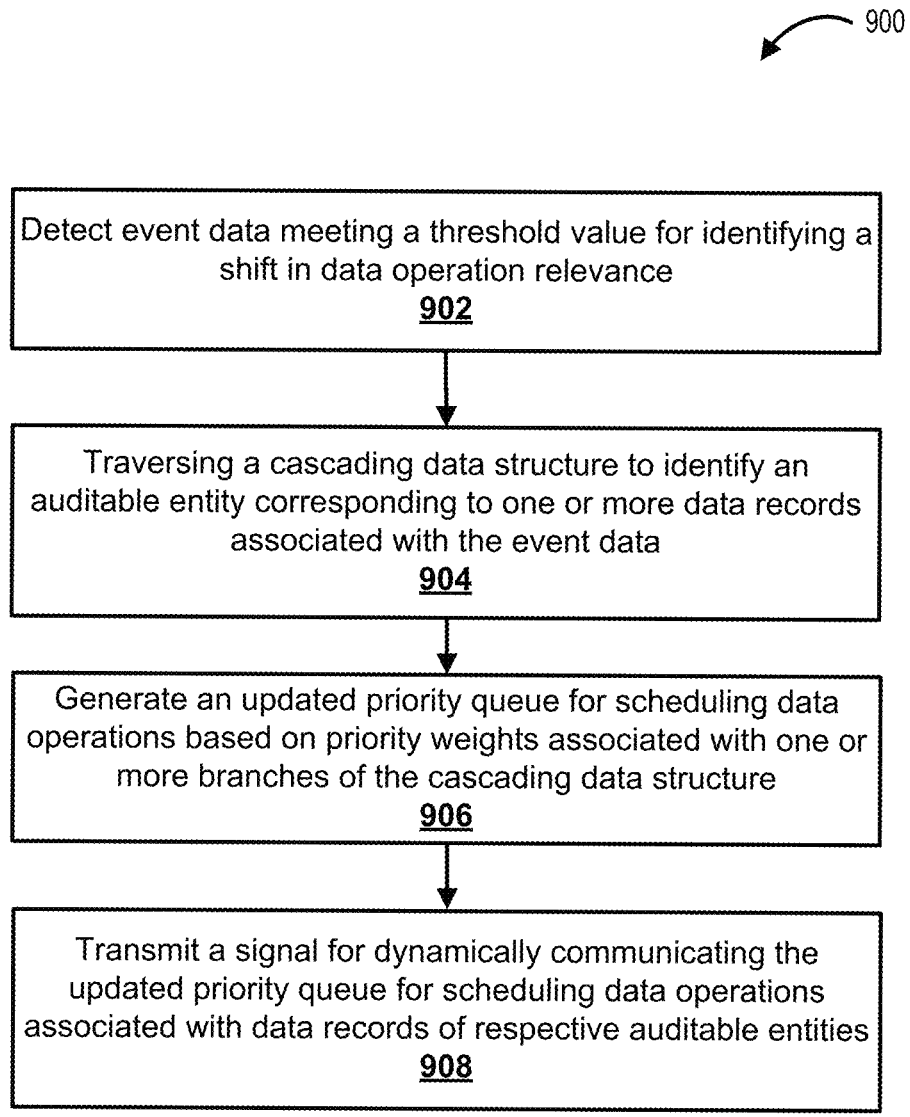
FIG. 9 illustrates a flowchart of a method of dynamically updating a priority queue for scheduling data operations associated with data records, in accordance with an embodiment of the present disclosure.

Reference is made to FIG. 9, which illustrates a flowchart of a method 900 of dynamically updating a priority queue for scheduling data operations associated with data records, in accordance with embodiments of the present disclosure. Pluralities of data records may correspond to or be associated with one or more branches of a cascading data structure, and the respective branches may be associated with priority weights. The method may be conducted by the processor 102 of the system 100 (FIG. 1). Processor-readable instructions may be stored in the memory 106 and may be associated with the data process recommender application 112 or other processor readable applications not illustrated in FIG. 1. The method 900 may include operations, such as data retrievals, data manipulations, data storage, or the like, and may include other computer executable functions. In some other embodiments, the method 900 may be conducted by a processor of the client device 130, and the client device 130 may transmit data messages to or from the data source devices.

In some embodiments, the processor may obtain one or more data records associated with entities. The respective entities may be associated with at least one branch of a cascading data structure, such as the cascading data structure 800 illustrated in FIG. 8. Other data structures may be contemplated.

As described with reference to FIG. 8, one or more branches, sub-branches (e.g., derivatives of branches), etc. may correspond to an auditable entity, organization department/division, or organizational unit. The respective branches may be associated with data records for a particular auditable entity. In some examples, the data records may include datasets related to event data. In some embodiments, the data records may include datasets for determining metrics, such as number of information technology related incident tickets, number of identified fraud events for a particular business unit of a banking institution, quantity of monetary loss due to a system breach, attrition rate of employees over time, costs or expenditures for a business unit of an organization, or other types of event data related to metrics or organizational risk. For instance, other types of metrics that may be determined from data records may include those illustrated in FIG. 3. Other types of events or metrics determined from data records may be contemplated.

At operation 902, the processor may detect event data meeting a threshold value for identifying a shift in data operation relevance. In some examples herein, the detected event data may include external news data associated with advanced indication of changes or event data associated with one or more data records corresponding to one or more auditable entities.

For example, the processor may obtain external news data from news portals or news servers from other geographical regions. The external news data may include datasets indicating that securities regulatory scrutiny (e.g., financial markets) is on the rise in a neighboring financial market. Such external news data may be useful for identifying a potential requirement to shift data operation (e.g., audit operation) relevance for a banking institution. Accordingly, the methods described in the present disclosure may update priority queues for scheduling audit operations associated with data records on a dynamic basis, rather than at static planned points in time (e.g., yearly basis).

In another example, the processor may obtain external news data from news portals or news servers of a spread of a new virus, such as the COVID-19 virus. Such external news data may be useful for predicting a potential shift in audit operation relevance for a banking institution (e.g., increase scrutiny of online banking or electronic transaction data sets as social distancing measures may increase, as in-person related transactions at brick-and-mortar banking institution may decrease). Accordingly, the methods described in the present disclosure may update priority queues for scheduling audit operations associated with data records on a dynamic or as-needed basis.

It may be appreciated that when setting plans for scheduled audit operations at static points in time (e.g., every October on an annual basis), a banking institution may be unable to dynamically adapt audit operations or other data record related operations in response to emerging or changing circumstances (e.g., emergence of COVID-19 pandemic in January, with audit operation plans determined in the prior October month).

Based on the event data, the processor at operation 904 may traverse a cascading data structure to identify an auditable entity corresponding to one or more data records associated with the event data. The one or more data records may correspond to at least one branch of the cascading data structure.

As an example, once the processor has identified one or more data records associated with event data (e.g., potential increase scrutiny from regulatory agencies for financial fraud, as indicated from a neighbouring region), the processor may identify one or more relevant auditable entities. The processor may traverse the cascading data structure to identify the relevant organizational unit or group. As opposed to processor operations to parse through voluminous or unstructured datasets of a data lake, in some embodiments, by associating data records with a cascading data structure, more computationally efficient and time efficient methods of identifying auditable entities may be provided.

At operation 906, the processor may generate an updated priority queue for scheduling data operations based on priority weights associated with one or more branches of the cascading data structure. The updated priority queue may be based on event data corresponding to the identified auditable entity relative to the event data associated with one or more records corresponding to other auditable entities.

As an illustrating example, in the above-described example of an emergence of a health pandemic, the processor may generate updated priority queues for scheduling audit operations on data records associated with online banking transactions as an urgent priority, while delaying audit operations on data records associated with paper-based or in-person based banking transactions, at least, because the volume of in-person based banking transactions may decrease due to social distancing mandates during a health pandemic.

At operation 908, the processor may transmit a signal for dynamically communicating the updated priority queue for scheduling data operations associated with data records of respective auditable entities. In some embodiments, the processor may generate a signal for displaying a dynamic user interface illustrating emerging event data corresponding to shifts in data operation relevance. As illustrated in some example drawings of the present disclosure, the dynamic user interface may provide graphical user interface elements for indicating quantifiable trends of operational risk events, of audit issue reports, categorized risk issues for respective organizational units, or the like.

In some embodiments, the dynamic user interface may display categorical risk ratings, such as low risk, medium risk, or high risk for one or a plurality of sub-risk categories (e.g., finance, information technology, operations, people, etc.).

In some embodiments, the detected event data meeting a threshold value may be based on continuous monitoring of data records associated with auditable entities of an organization. For example, systems described herein may be configured to continuously parse updated or new data records over time for determining whether event data of the updated/new data records of an online banking business may indicate a rapid increase in customer usage or a rapid increase in customers reporting that they cannot log into an online banking account.

To illustrate, the processor may obtain, from one or more data source devices, data records associated with entities. The entities may be associated with respective branches of a cascading tree structure. The cascading tree structure may be a computing model for organizing a plurality of datasets or data records. Embodiment systems described herein may be configured to dynamically identify auditable entities in response to event data that may signal a shift in data operation (e.g., audit operation) relevance.

In an example where event data may include tallies of quantities of fraud events uncovered for an online banking business unit, the processor may parse event data from the one or more data records to be associated with a plurality of discrete time intervals. For instance, the processor may determine a number of fraud events on a fiscal quarter-by-quarter basis. The discrete time intervals may be a three month interval, and the processor may determine quantities of fraud events on three month intervals.

In some embodiments, the processor may generate moving average index values for respective event data for the respective data records. For instance, the processor may determine a four-quarter moving average or an eight-quarter moving average of the number of fraud events. In some scenarios, the processor may determine moving averages for determining relative risk in lieu of absolute or percentage delta comparisons because relative comparisons to moving averages may be resistant to aberrant one-off events.

The processor may detect event data meeting a threshold value. The processor may determine that a detected event data deviates from a moving average index associated with a corresponding data record of the identified auditable entity by at least a threshold value. As an example, the processor may continuously process datasets and may determine event data including number of fraud events over the past 3 month period. When the determined number of fraud events of the past 3 month period exceeds a four or eight quarter moving average value, the processor may determine that audit operations relating to online business units may need to be increased or more heavily scrutinized. It may be appreciated that moving average metrics and fraud incident metrics are illustrating examples, and other metrics and associated relative metrics may be contemplated. In some embodiments, the threshold value may be relative values, such as percentages or other relative values.

In another embodiment, the detected event data meeting a threshold value may be based on external news data associated with advanced indication of changes to event data associated with a particular auditable entity. In the present example, the processor may obtain external news data including external text-based data and may process the external text-based data based on natural-language process operations to determine frequency indices associated with n-grams of the external text-based data. Further, the processor may determine that one or more determined frequency indices associated with the n-grams of the external text-based data deviates from frequency indices of n-grams of data records corresponding to one or more auditable entities.

To illustrate, upon obtaining external news data including external text-based data, the processor may conduct operations to determine a greater quantity of n-grams or text-based data associated with increasing death toll due to a health crisis, or a greater quantity of text-based data indicating that "public companies may be freezing dividends to shareholders during uncertainty due to an emerging health pandemic period". The processor may conduct operations to determine that particular n-grams associated with emerging changes may be greater than comparable n-grams determined from data records in the past several months, and may thus determine that the external news data may indicate imminent changes associated with one or more auditable entities of the banking institution.

In some embodiments, the threshold value at operation 902 for identifying a shift in data operation relevance may be a configurable threshold value. For example, when the processor conducts operations to compare moving average index values associated with a number of fraud events with an identified quantity of fraud events in the current month, the threshold value to indicate that new audit operations may be required may be tuned (e.g., may be configured as 50% difference, 20% difference, etc.) or any other configurable value.

In some embodiments, priority weights associated with one or more branches of the cascading data structure (e.g., described with reference to operation 906) may include an aggregate frequency value of event occurrences associated with one or more data records.

To illustrate, referring again to the cascading data structure 800 of FIG. 8, a priority weight (W1) associated with the "Personal and Commercial Banking" branch or node 802 may include an aggregate frequency value or weight (W1a) of online banking fraud incidents of the "International Banking" branch and an aggregate frequency value or weight (W1b) of online fraud incidents of the "Canadian Banking" branch. In some embodiments, the frequency values or weights may be "rolled up" or propagated up and included as a priority weight (W1) for the auditable entity "Personal and Commercial Banking" unit. In some scenarios, by propagating priority weights of sub-branches to parent branches, the processor may determine priority weights at auditable unit or higher-level unit levels when generating updated priority queues for scheduling audit or data operations associated with data records.

In some embodiments, it may be beneficial to assign greater weights to particular auditable entities or units irrespective of frequency or quantity related weights associated with event data from data records. For example, a banking institution may determine that the auditable entity "Capital Markets" may be a heavily regulated and profitable aspect of the banking business. Accordingly, in some embodiments, the priority weight (W3) associated with the "Capital Markets" may additionally include a coefficient multiplier for biasing priority of data records associated with "Capital Markets" unit.

For instance, in a scenarios where the number of reported fraud incidents of the "Personal and Commercial Banking" unit may be quantitatively larger than the number of reported fraud incidents of the "Capital Markets" unit, it may nonetheless be desirable for a banking institution to prioritize audit operations of data records associated with the "Capital Markets" unit. Accordingly, to bias priority of auditable entities, the priority weight (W3) associated with the "Capital Markets" unit may include a coefficient multiplier such that the priority weight of the "Capital Markets" unit may be stronger even though the volume of event data may not be greater than the "Personal and Commercial Banking" unit.

In some embodiments, the priority weights associated with one or more branches corresponding to an auditable entity may include a combination of scaled priority weights associated with sub-branches. In some examples, the sub-branches may be derived from at least one branch corresponding to an auditable entity. In some embodiments, scaled priority weights may include key risk indicators, such as those described with reference to the table 500 of FIG. 5. The scaled priority weights may be scaled to alternate ranges (e.g., from a range of "1 to 100" to a range of "0 to 10"), such that relative priority weights may be evaluated. In some embodiments, scaled priority weights may include assigning risk categories (e.g., high, medium, low) to ranges (e.g., 0 to 3.3=low, 3.3 to 6.6=medium, and 6.6 to 10=high).

In embodiments disclosed herein, priority weights may be values, such as key risk indicator values or other types of values, for quantitatively comparing or prioritizing a set of data operations (e.g., audit operations) associated with an auditable entity over another auditable entity.

Figure 10:
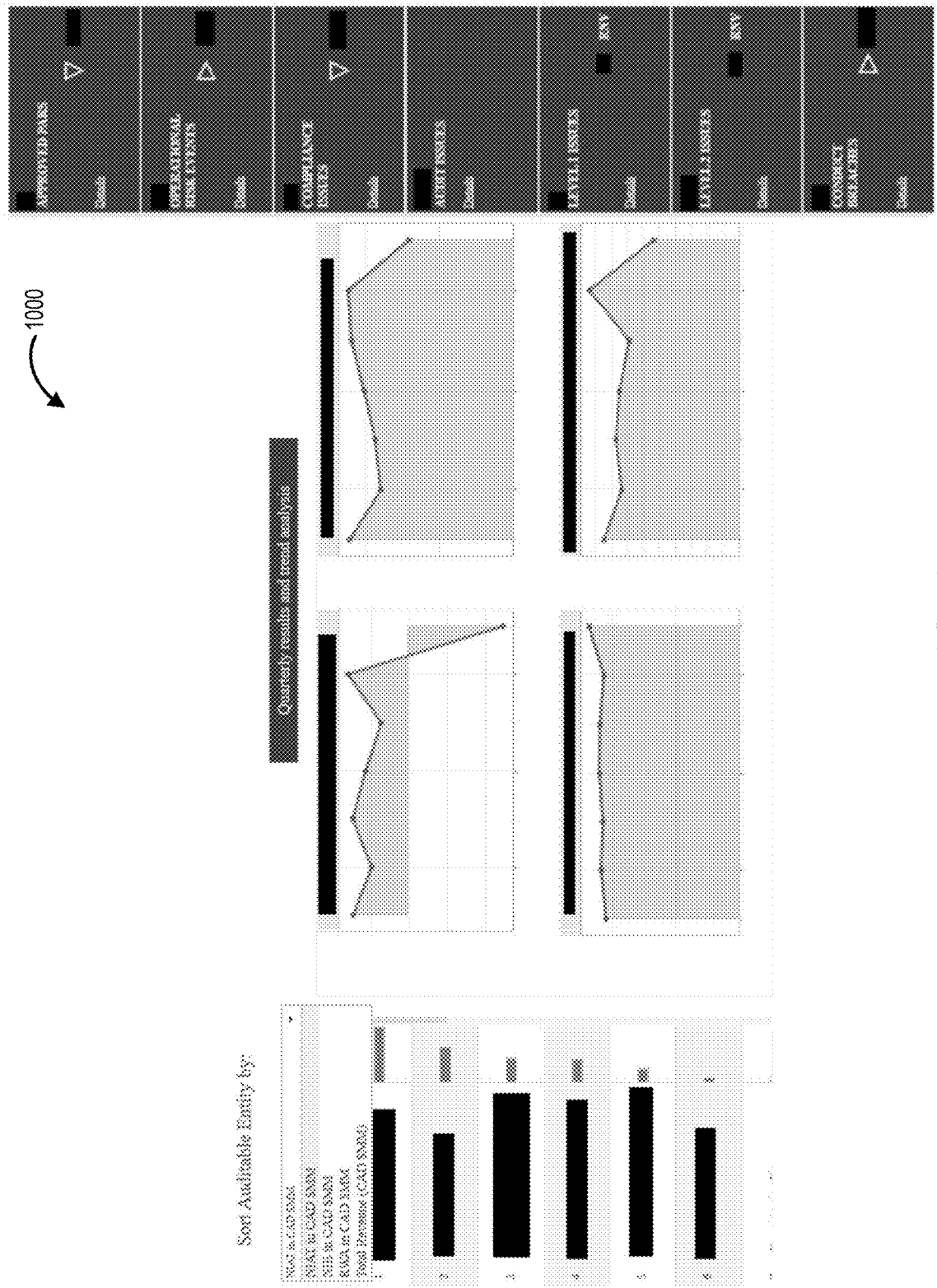
FIG. 10 illustrates a graphical user interface, in accordance with an embodiment of the present disclosure.

Reference is made to FIG. 10, which illustrates a graphical user interface 1000, in accordance with an embodiment of the present disclosure. The system 100 (FIG. 1) may generate the graphical user interface 1000 for displaying a materiality comparison associated with a plurality of data records to assist in prioritization of identifying auditable entities having similar determined risk indicators.

The graphical user interface 1000 may also include informational interface regions illustrating platform level metrics, thereby allowing users to identify trends associated with particular entity levels of interest.

Figure 11:
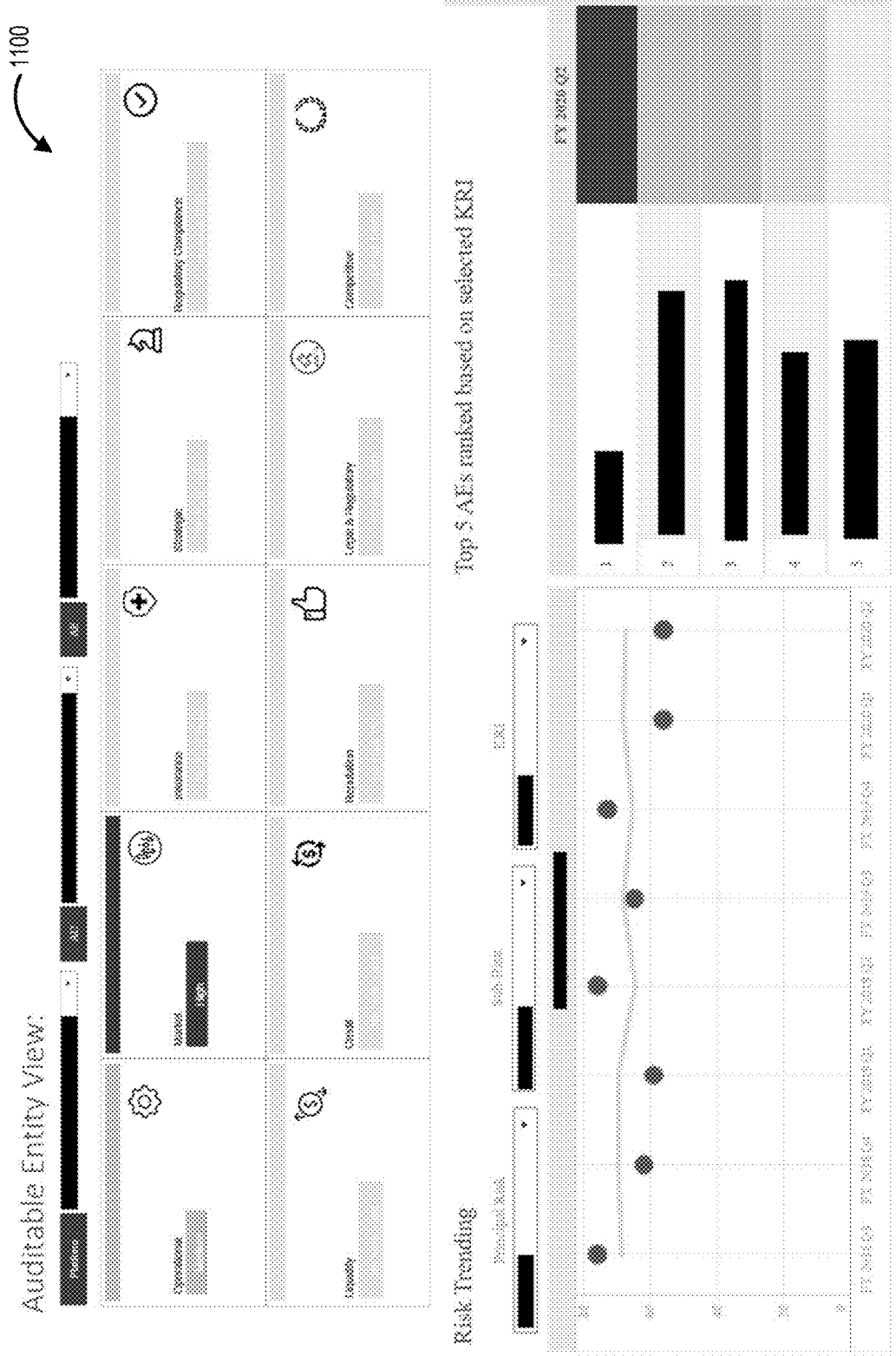
FIG. 11 illustrates a graphical user interface, in accordance with an embodiment of the present disclosure.

Reference is made to FIG. 11, which illustrates a graphical user interface 1100, in accordance with an embodiment of the present disclosure. The graphical user interface 1100 may graphically illustrate a comparison of key risk indicators associated with one or more auditable entities, and may also illustrate contribution of each auditable entity to the overall key risk indicator for the platform.

The graphical user interface 1100 may also include informational interface regions for respective principal risk types indicating areas of risk.

Figure 12:
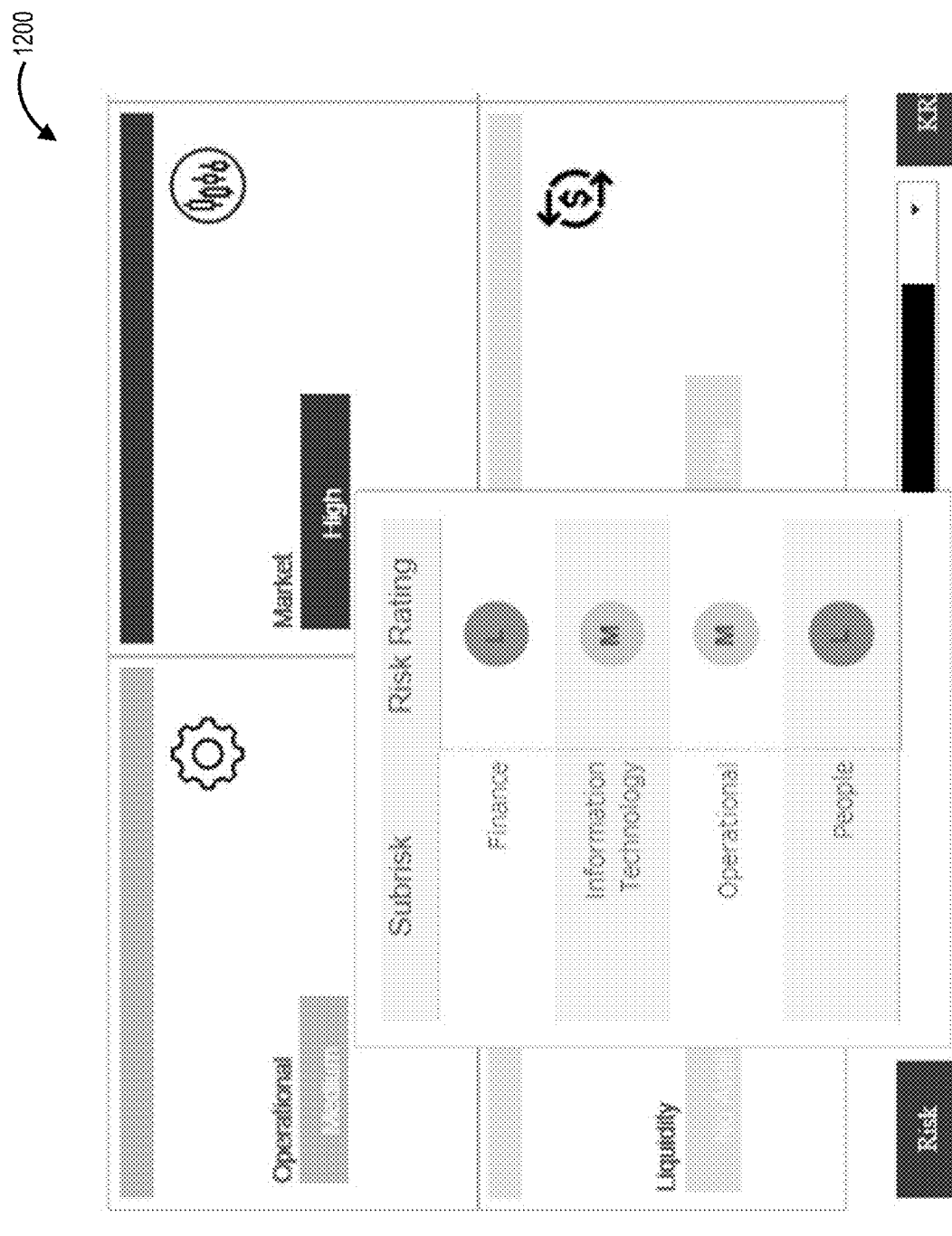
FIG. 12 illustrates a graphical user interface, in accordance with an embodiment of the present disclosure.

Reference is made to FIG. 12, which illustrates an enlarged view of a portion of the graphical user interface of FIG. 11. In FIG. 12, a hover-over information interface box illustrates risk rating categories for the operational risk category.

Figure 13:
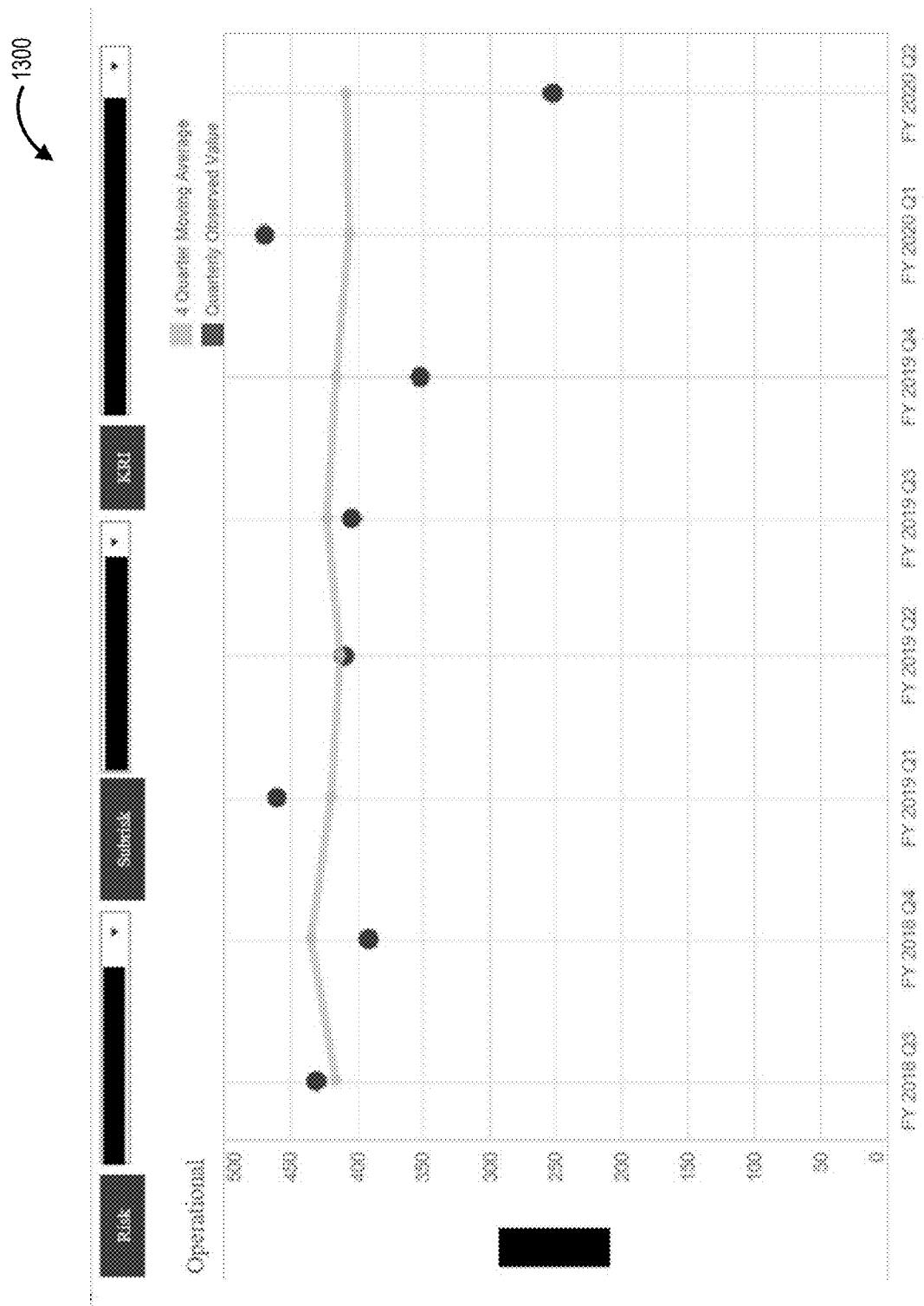
FIG. 13 illustrates a graphical user interface, in accordance with an embodiment of the present disclosure.

Reference is made to FIG. 13, which illustrates a graphical user interface 1300, in accordance with an embodiment of the present disclosure. The graphical user interface 1300 is configured to display key risk indicators at an entity level at a particular position on a data tree structure.

Figure 14:
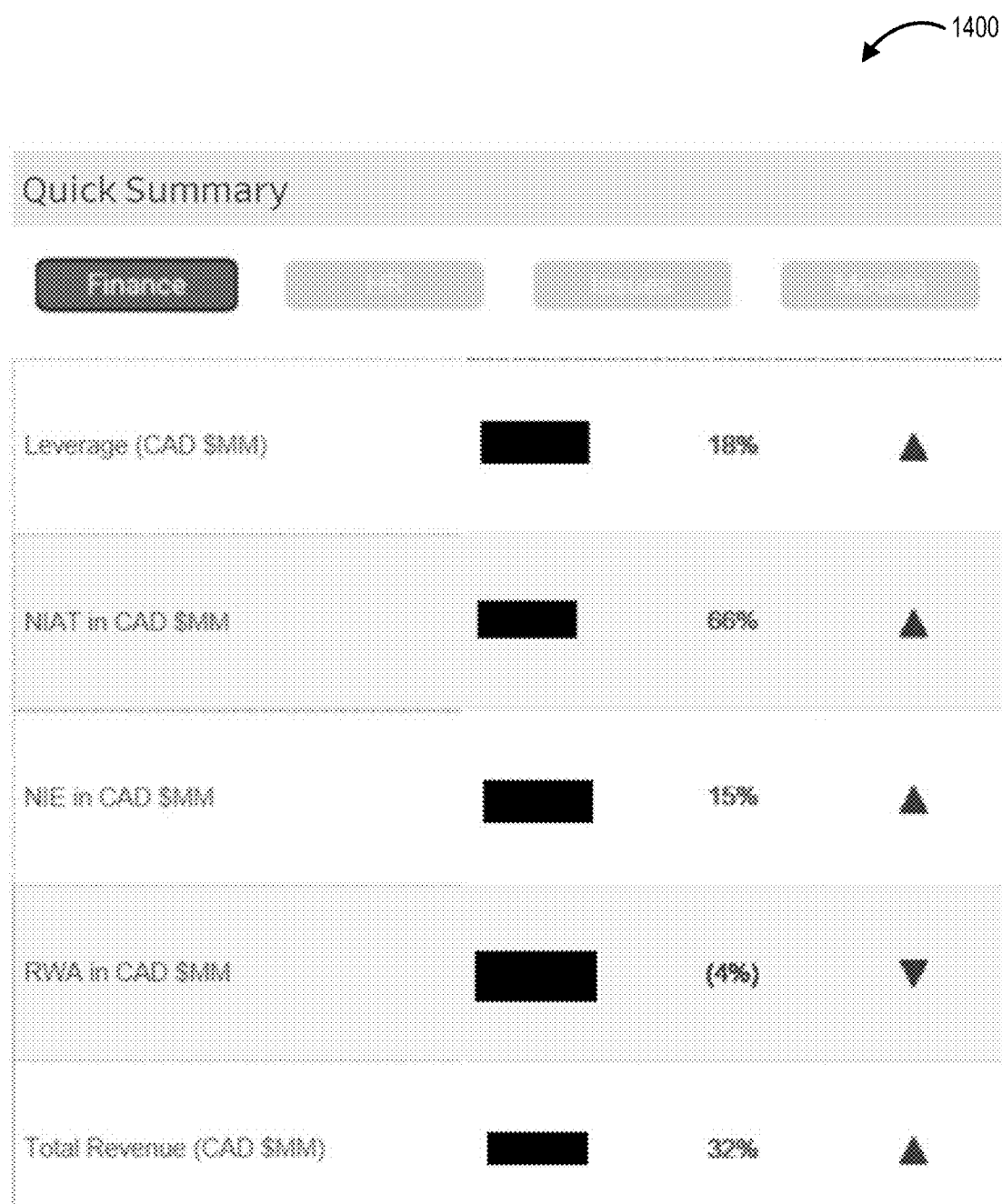
FIG. 14 illustrates a graphical user interface, in accordance with an embodiment of the present disclosure.

Reference is made to FIG. 14, which illustrates a graphical user interface 1400, in accordance with an embodiment of the present disclosure. The graphical user interface 1400 may be configured to provide a summary view of key performance indicators or key risk indicators for respective auditable entities. The summary view may include a quarter-over-quarter increase or decrease for financial performance, changes in the number of personnel, audit and compliance issues and corresponding levels, information technology metrics such as applications, the number of financial models that may be owned by the auditable entity, or other types of metrics.

Reference is made to FIG. 15, which illustrates a graphical user interface 1500, in accordance with an embodiment of the present disclosure. The graphical user interface 1500 may be configured to display trending topics based on external data sources that may trigger the system 100 (FIG. 1) to recommend dynamic adjustments to audit operations on an off-cycle basis. In some embodiments, the news articles may be categorized and trends may be calculated based on 3 or 6 month time periods. News article topics may be ordered by topical growth rates, and the graphical user interface 1500 may be configured to provide access to original articles. In scenarios where the news article topics may contribute to changes in economic environments affecting a banking institution, users of the system 100 may readjust or calibrate audit operations decisions based on anticipated changes in economic environments (e.g., an outbreak of a novel coronavirus in one country may be an indication that the outbreak may spread to another country in the near future).

Figure 16:
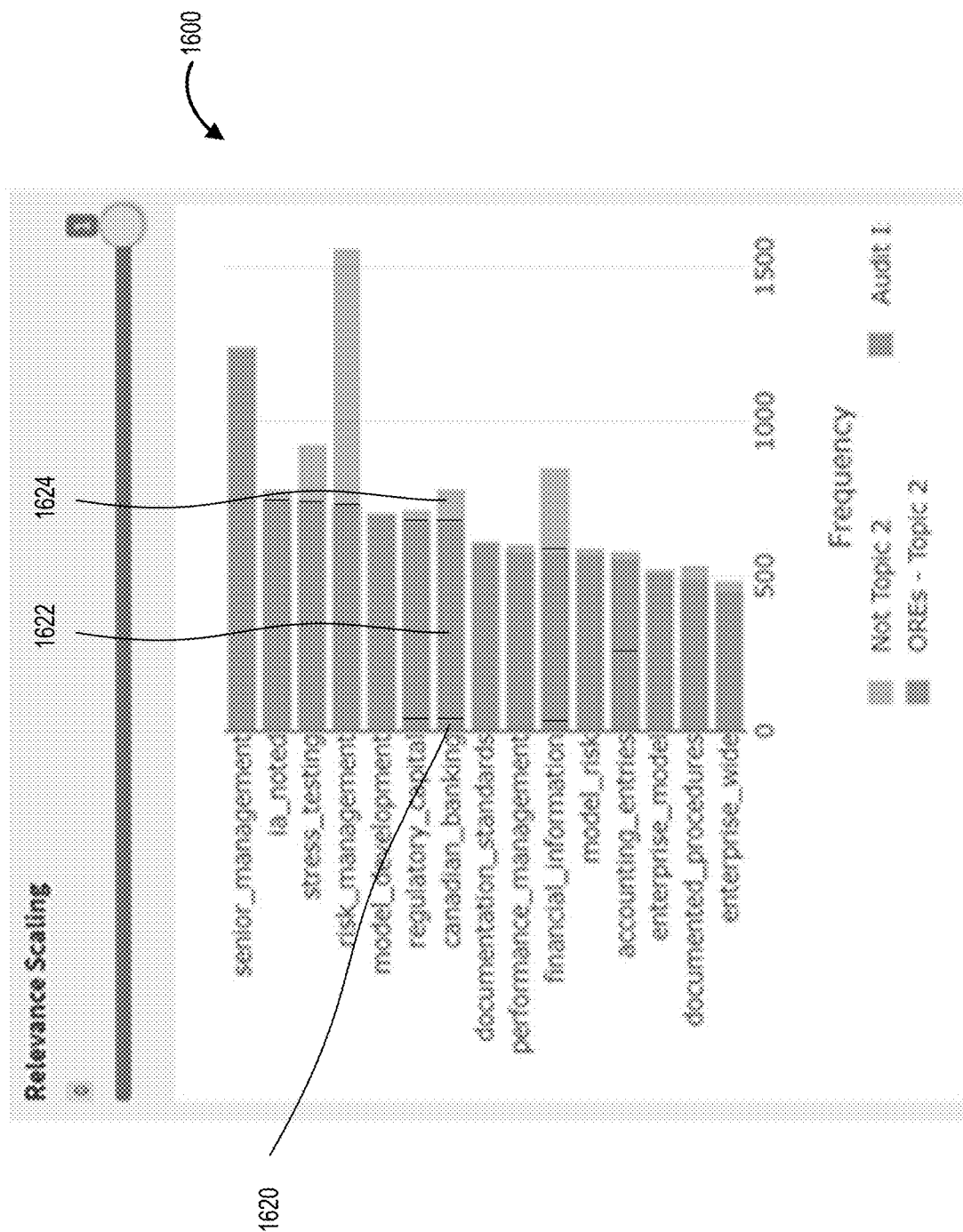
FIG. 16 illustrates a graphical user interface, in accordance with an embodiment of the present disclosure.

Reference is made to FIG. 16, which illustrates a graphical user interface 1600, in accordance with an embodiment of the present disclosure. The graphical user interface 1600 may be configured to illustrate frequency data of n-grams that form overall issue topic or themes. In some embodiments, the system 100 (FIG. 1) may generate n-grams based on text-based data records using natural language processing operations. In the illustrated example of FIG. 16, the overall issue topic and/or theme may be "Model Risk Management" (e.g., Topic 2). Further, the graphical user interface 1600 may illustrate frequency data for operational risk events (OREs) for Topic 2, audit issues for Topic 2, and also events associated with "other topics".

In FIG. 16, for the n-gram corresponding to "Canadian_banking", the graphical user interface 1600 may visually illustrate first frequency data 1620 associated with operational risk events of the n-gram "Canadian_banking", second frequency data 1622 associated with audit issue events of n-gram "Canadian_banking", and third frequency data 1624 associated with topics other than Topic 2 (e.g., other than the "Model Risk Management" topic). Other examples of categories of frequency data for the respective n-grams may be contemplated.

By separately indicating the categories of frequency data, the graphical user interface 1600 may visually illustrate that the n-gram "Canadian_banking" may be associated with data records associated with topics other than Topic 2, thus indicating that events relating to Canadian Banking may be evolving to include other topics. Further, the graphical user interface 1600 may provide an indication on the proportion of n-grams associated with operational risk events relative to n-grams associated with audit issues, thereby suggesting that there may be a disproportional excess of audit coverage or inadequate audit coverage, as the scenario may be.

Thus, in some embodiments, the system 100 (FIG. 1) may detect event data based on frequency index values associated text-based event data (e.g., n-grams derived from text-based event data) of data records and may conduct topical analysis for determining unanticipated changes in events leading to increases or decreases in metrics. Based on operations of data record analysis, the system 100 may display user interfaces for identifying deficiencies or excess audit operation coverage (e.g., current audit plans), and for indicating that updated priority scheduling of audit operations may be warranted, in view of continuous data record analysis.

Some embodiments of the present disclosure provide systems for dynamically recommending audit operations on a near real-time basis, in response to detected events indicating unanticipated or unplanned increases or decreases in event activity. Systems may detect events based on one or more threshold values. In some embodiments, event data may be compared against a first threshold value such that, when event data meets the first threshold value, the systems may generate signals for communicating alerts or notifications to an administrator device. The first threshold value may be associated with a precursor to a second threshold value. For example, the first threshold value may be calibrated to provide notifications that there may be a large increase in events within a short period of time which may be of interest to a user of an administrator device (e.g., early warning indicators).

In some embodiments, when event data meets the second threshold value, the system may generate updated audit operation plans. The updated audit operation plans may reconfigure, reorder, or otherwise alter audit operation plans for adapting to changing event circumstances.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present disclosure is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

As can be understood, the examples described above and illustrated are intended to be exemplary only. Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

What is claimed is:

1. A system for dynamically updating a priority queue for scheduling data operations associated with data records, the system comprising:
a processor;
a memory coupled to the processor and storing processor-executable instructions that, when executed, configure the processor to:
schedule, by a data process recommender, for execution over a first time period, data operations for data records associated with a plurality of auditable entities, wherein said scheduling comprises generating a series or sequence of data process segments associated with an audit process for said plurality of auditable entries, and determining priority weights for the respective plurality of data process segments;
receive, by a communication circuit of said system, and store, in said memory, event data from one or more data source devices;
detect that one or more event data objects meet a threshold value for identifying a shift in data operations relevance indicating emergence of a time-varying event associated with the plurality of auditable entities during the first time period, wherein the event data objects includes external news data associated with advanced indication of changes to event data associated with one or more data records corresponding to one or more auditable entities, wherein detecting event data meeting the threshold value includes:
obtaining the external news data including external text-based data;
parsing the external text-based data using natural-language processing to determine frequency indices associated with n-grams of the external text-based data; and
determining that one or more of the determined frequency indices associated with the n-grams of the external text-based data deviates from frequency indices of n-grams of data records corresponding to one or more auditable entities;
based on the event data, traverse a cascading data structure to identify the plurality of auditable entities corresponding to one or more data records, the one or more data records corresponding to at least one branch of the cascading data structure;
generate an updated priority queue for re-allocating data operations prior to expiration of the first time period, wherein re-allocating data operations includes updating priority weights associated with one or more branches of the cascading data structure, the updated priority queue based on event data corresponding to the identified auditable entities relative to event data associated with one or more records corresponding to other auditable entities associated with data records not meeting the threshold value, and wherein said updated priority queue includes updated weights and orders for said series or sequence of data process segments associated with said updated audit process;
transmitting the updated priority queue for scheduling data operations associated with data records of respective auditable entities; and
performing, by said processor of said system, the scheduled data operations in accordance with the updated priority queue and updated series or sequence of data process segments associated with said updated audit process.

2. The system of claim 1, wherein the priority weights associated with the one or more branches of the cascading data structure includes an aggregate frequency value of event occurrences associated with one or more data records associated with the respective branches.

3. The system of claim 2, wherein one or more of the priority weights includes a coefficient multiplier associated with the corresponding branch for biasing priority of the auditable entity corresponding to that branch of the cascading data structure.

4. The system of claim 1, wherein the priority weights associated with the one or more branches corresponding to an auditable entity include a combination of scaled priority weights associated with sub-branches derived from the at least one branch corresponding to an auditable entity.

5. The system of claim 1, wherein the signal for dynamically communicating the updated priority queue includes a signal for displaying a dynamic user interface illustrating emerging event data corresponding to shifts in data operation relevance.

6. The system of claim 1, wherein the processor-executable instructions, when executed, configure the processor to:
obtain one or more data records associated with entities of respective branches of the cascading tree structure;
parse event data from the one or more data records to be associated with a plurality of discrete time intervals; and
generate moving average index values for respective event data for the respective data records for two or more of the plurality of discrete time intervals,
and wherein detecting the event data meeting a threshold value includes:
determining that the detected event data deviates from a moving average index associated with a corresponding data record of the identified auditable entity by at least the threshold value.

7. The system of claim 1, wherein the threshold value for identifying the shift in data operation relevance is a configurable threshold value.

8. The system of claim 1, wherein the threshold value includes a first sub-threshold value and a second sub-threshold value, and wherein the processor-executable instructions, when executed, configure the processor to:
in response to detecting the event data meeting the first sub-threshold value, generate a signal for transmitting to a client device a notification message, in substantially real-time, an unplanned increase or a decrease in event data metrics; and
in response to detecting the event data meeting the second sub-threshold value, generate the updated priority queue for scheduling the data operations.

9. A method for dynamically updating a priority queue for scheduling data operations associated with data records comprising:
scheduling, by a data process recommender, for execution over a first time period, data operations for data records associated with a plurality of auditable entities, wherein said scheduling comprises generating a series or sequence of data process segments associated with an audit process for said plurality of auditable entries, and determining priority weights for the respective plurality of data process segments;
receiving, by a communication circuit, and storing, in a memory, event data from one or more data source devices;

detecting that one or more event data objects meet a threshold value for identifying a shift in data operations relevance indicating emergence of a time-varying event associated with the plurality of auditable entities during the first time period, wherein the event data objects includes external news data associated with advanced indication of changes to event data associated with one or more data records corresponding to one or more auditable entities, wherein detecting event data meeting the threshold value includes:
  obtaining the external news data including external text-based data;
  parsing the external text-based data using natural-language processing to determine frequency indices associated with n-grams of the external text-based data; and
  determining that one or more of the determined frequency indices associated with the n-grams of the external text-based data deviates from frequency indices of n-grams of data records corresponding to one or more auditable entities;
based on the event data, traversing a cascading data structure to identify the plurality of auditable entities corresponding to one or more data records, the one or more data records corresponding to at least one branch of the cascading data structure;
generating an updated priority queue for re-allocating data operations prior to expiration of the first time period, wherein re-allocating data operations includes updating priority weights associated with one or more branches of the cascading data structure, the updated priority queue based on event data corresponding to the identified auditable entities relative to event data associated with one or more records corresponding to other auditable entities associated with data records not meeting the threshold value, and wherein said updated priority queue includes updated weights and orders for said series or sequence of data process segments associated with the updated audit process;
transmitting the updated priority queue for scheduling data operations associated with data records of respective auditable entities; and
performing, by a processor, the scheduled data operations in accordance with the updated priority queue and said updated series or sequence of data process segments associated with said updated audit process.

10. The method of claim 9, wherein the priority weights associated with the one or more branches of the cascading data structure includes an aggregate frequency value of event occurrences associated with one or more data records associated with the respective branches.

11. The method of claim 10, wherein one or more of the priority weights includes a coefficient multiplier associated with the corresponding branch for biasing priority of the auditable entity corresponding to that branch of the cascading data structure.

12. The method of claim 9, wherein the priority weights associated with the one or more branches corresponding to an auditable entity include a combination of scaled priority weights associated with sub-branches derived from the at least one branch corresponding to an auditable entity.

13. The method of claim 9, wherein the signal for dynamically communicating the updated priority queue includes a signal for displaying a dynamic user interface illustrating emerging event data corresponding to shifts in data operation relevance.

14. The method of claim 9, comprising:
obtaining one or more data records associated with entities of respective branches of the cascading tree structure;
parsing event data from the one or more data records to be associated with a plurality of discrete time intervals; and
generating moving average index values for respective event data for the respective data records for two or more of the plurality of discrete time intervals,
and wherein detecting the event data meeting a threshold value includes:
  determining that the detected event data deviates from a moving average index associated with a corresponding data record of the identified auditable entity by at least the threshold value.

15. The method of claim 9, wherein the threshold value includes a first sub-threshold value and a second sub-threshold value, and wherein the method comprising:
in response to detecting the event data meeting the first sub-threshold value, generating a signal for transmitting to a client device a notification message, in substantially real-time, an unplanned increase or a decrease in event data metrics; and
in response to detecting the event data meeting the second sub-threshold value, generating the updated priority queue for scheduling the data operations.

16. A non-transitory computer-readable medium or media having stored thereon machine interpretable instructions which, when executed by a processor, cause the processor to perform a computer-implemented method for dynamically updating a priority queue for scheduling data operations associated with data records, the method comprising:
scheduling, by a data process recommender, for execution over a first time period, data operations for data records associated with a plurality of auditable entities, wherein said scheduling comprises generating a series or sequence of data process segments associated with an audit process for said plurality of auditable entries, and determining priority weights for the respective plurality of data process segments;
receiving, by a communication circuit of said system, and storing, in said memory, event data from one or more data source devices;
detecting that one or more event data objects meet a threshold value for identifying a shift in data operations relevance indicating emergence of a time-varying event associated with the plurality of auditable entities during the first time period, wherein the event data objects includes external news data associated with advanced indication of changes to event data associated with one or more data records corresponding to one or more auditable entities, wherein detecting event data meeting the threshold value includes:
  obtaining the external news data including external text-based data;
  parsing the external text-based data using natural-language processing to determine frequency indices associated with n-grams of the external text-based data; and
  determining that one or more of the determined frequency indices associated with the n-grams of the external text-based data deviates from frequency indices of n-grams of data records corresponding to one or more auditable entities;
based on the event data, traversing a cascading data structure to identify the plurality of auditable entities corresponding to one or more data records, the one or more data records corresponding to at least one branch of the cascading data structure;

generating an updated priority queue for re-allocating data operations prior to expiration of the first time period, wherein re-allocating data operations includes updating priority weights associated with one or more branches of the cascading data structure, the updated priority queue based on event data corresponding to the identified auditable entities relative to event data associated with one or more records corresponding to other auditable entities associated with data records not meeting the threshold value, and wherein said updated priority queue includes updates weights and orders for said series or sequence of data process segments associated with said updated audit process;

transmitting the updated priority queue for scheduling data operations associated with data records of respective auditable entities; and performing, by a processor, the scheduled data operations in accordance with the updated priority queue and updated series or sequence of data process segments associated with said updated audit process.

\* \* \* \* \*